US012358575B1

(12) United States Patent
Matus et al.

(10) Patent No.: US 12,358,575 B1
(45) Date of Patent: Jul. 15, 2025

(54) AUTONOMOUS VEHICLE CONNECTED TOOL INTERCHANGE SYSTEMS AND METHODS

(71) Applicant: RENU ROBOTICS CORP., San Antonio, TX (US)

(72) Inventors: Tim Alan Matus, San Antonio, TX (US); Michael Odell Blanton, Jr., San Antonio, TX (US)

(73) Assignee: RENU ROBOTICS CORP., San Antonio, TX (US)

( * ) Notice: Subject to any disclaimer, the term of this patent is extended or adjusted under 35 U.S.C. 154(b) by 214 days.

(21) Appl. No.: 18/217,464

(22) Filed: Jun. 30, 2023

Related U.S. Application Data

(63) Continuation-in-part of application No. 17/408,355, filed on Aug. 20, 2021, now Pat. No. 12,253,352.

(51) Int. Cl.
*B62D 49/06* (2006.01)
*B60D 1/36* (2006.01)
*B60D 1/64* (2006.01)
*H01R 43/26* (2006.01)

(52) U.S. Cl.
CPC ............ *B62D 49/065* (2013.01); *B60D 1/36* (2013.01); *B60D 1/64* (2013.01); *H01R 43/26* (2013.01)

(58) Field of Classification Search
CPC .......... B62D 49/065; B60D 1/36; B60D 1/64; H01R 43/26
See application file for complete search history.

(56) References Cited

U.S. PATENT DOCUMENTS

| | | | |
|---|---|---|---|
| 5,204,814 | A | 4/1993 | Noonan et al. |
| 7,668,631 | B2 | 2/2010 | Bernini |
| 8,958,939 | B2 | 2/2015 | Einecke et al. |
| 9,026,299 | B2 | 5/2015 | Johnson et al. |
| 9,137,943 | B2 | 9/2015 | Einecke et al. |
| 9,173,343 | B2 | 11/2015 | Bernini |
| 9,848,529 | B2 | 12/2017 | Franzius et al. |
| 10,104,837 | B2 | 10/2018 | Hashimoto et al. |
| 10,321,625 | B2 | 6/2019 | Einecke et al. |
| 10,698,417 | B2 | 6/2020 | Churavy et al. |
| 10,824,163 | B2 | 11/2020 | Einecke et al. |

(Continued)

*Primary Examiner* — Wade Miles
*Assistant Examiner* — Zachary Joseph Wallace

(57) ABSTRACT

Disclosed herein is an autonomous vehicle comprising at least one subsystem capable of determining a location corresponding to a connectable tool; determining an orientation for interconnecting with the connectable tool; aligning the autonomous vehicle for interconnecting with the connectable tool based on the location and the orientation of the connectable tool; engaging the connectable tool at one or more physical connection points and at least one electrical connection point; and establishing power line modem (PLM) communications between the autonomous vehicle and the connectable tool via an electrical power connection resulting from the engaging the at least one electrical connection point; and, before commencing full power operations over said electrical power connection, determining that the electrical power connection is without current diversion by transmitting a fixed amount of non-lethal electrical power from the autonomous vehicle to the connectable tool via the electrical power connection and determining whether the difference between the power transmitted by the autonomous vehicle and the power received by the connectable tool exceeds a threshold for indicating current diversion.

18 Claims, 10 Drawing Sheets

(56) References Cited

U.S. PATENT DOCUMENTS

| | | |
|---|---|---|
| 10,856,467 B2 | 12/2020 | Maggard |
| 10,888,046 B2 | 1/2021 | Gorenflo et al. |
| 2017/0108867 A1 | 4/2017 | Franzius et al. |
| 2021/0029873 A1 | 2/2021 | Yamauchi et al. |
| 2021/0059112 A1 | 3/2021 | Kim |
| 2021/0096574 A1 | 4/2021 | Lee et al. |
| 2021/0123742 A1 | 4/2021 | Yang et al. |
| 2021/0127569 A1 | 5/2021 | Gruhler et al. |
| 2021/0153428 A1 | 5/2021 | Mittmann et al. |
| 2021/0157327 A1 | 5/2021 | Lee et al. |

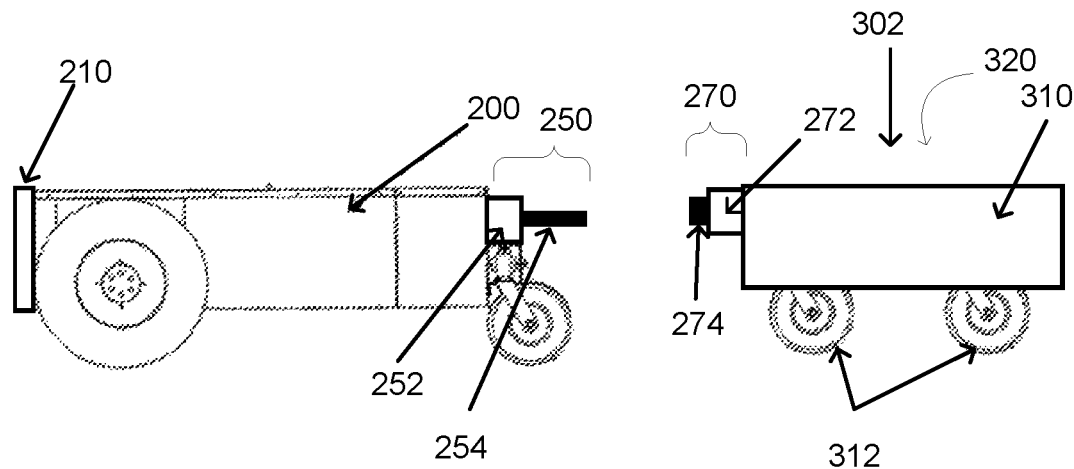
*FIG. 3A*
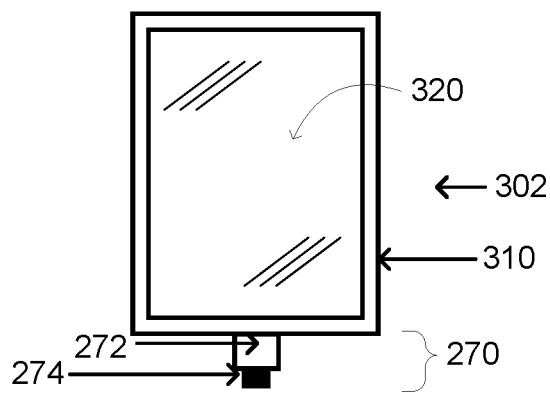
*FIG. 3B*
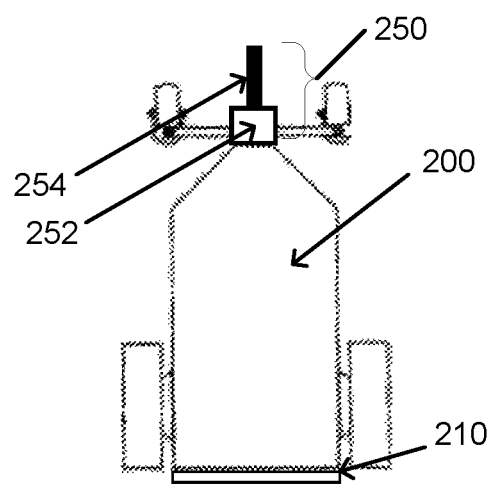

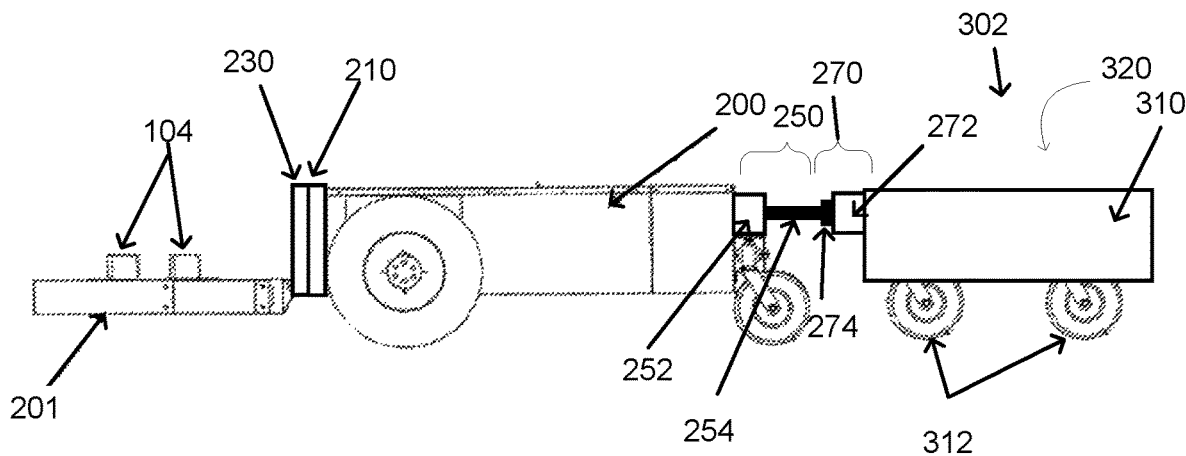
FIG. 4A  499
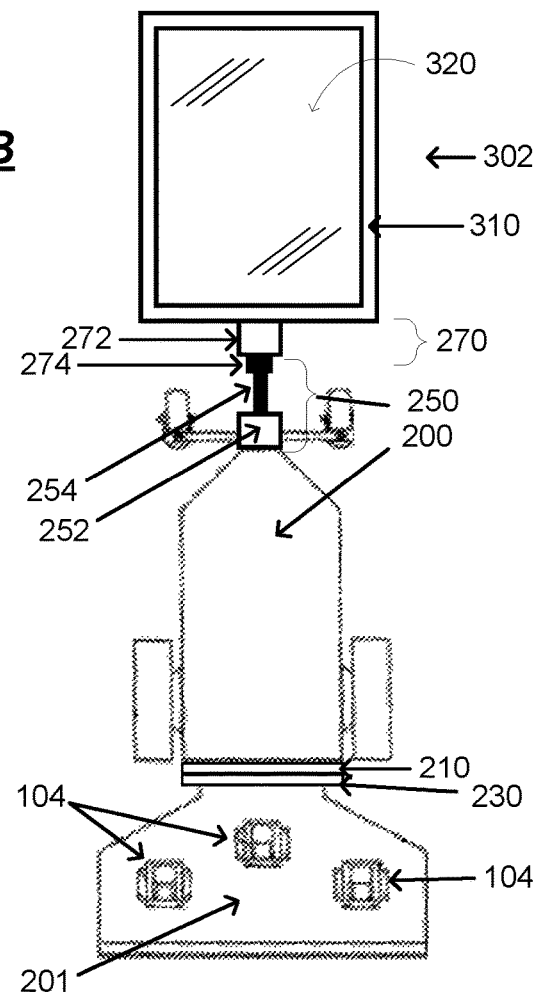
FIG. 4B  499'

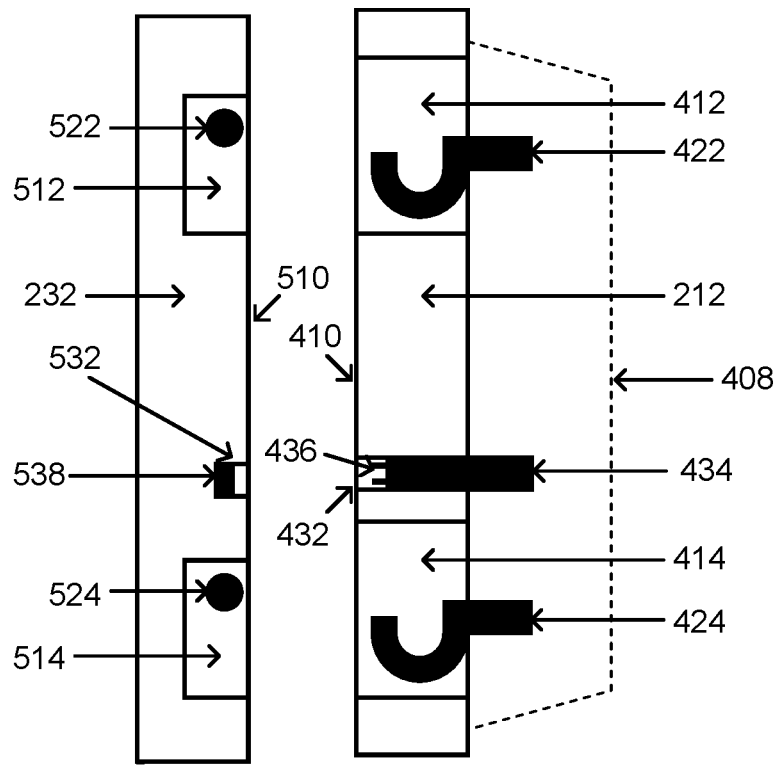
FIG. 5A
500
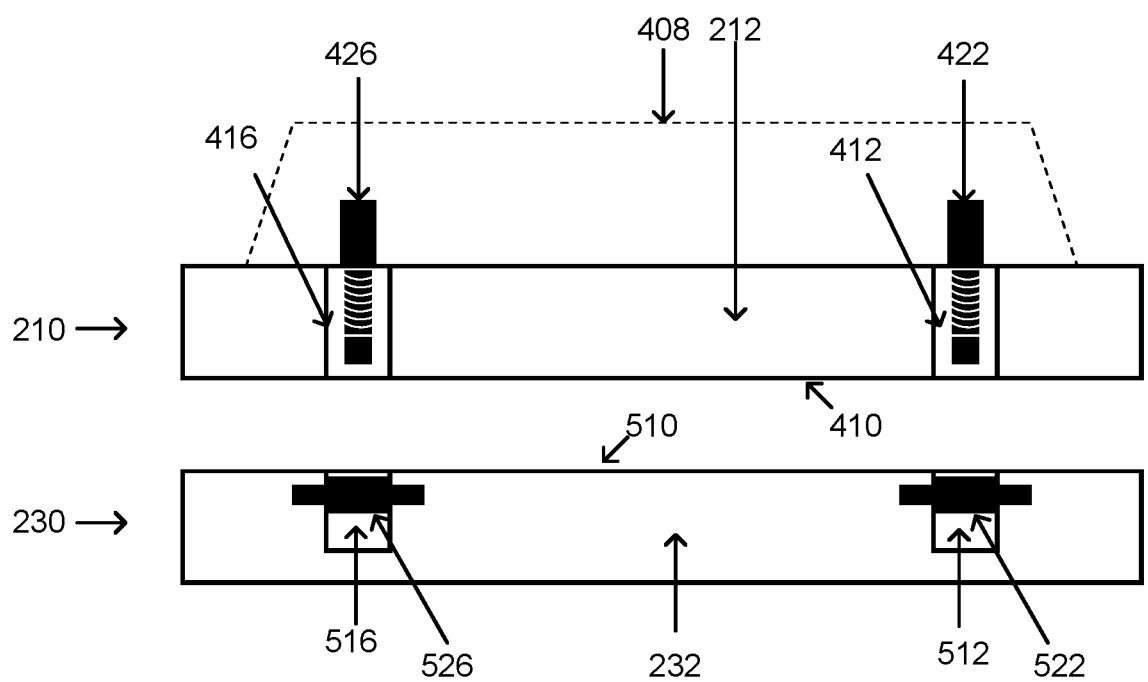
FIG. 5B
500'

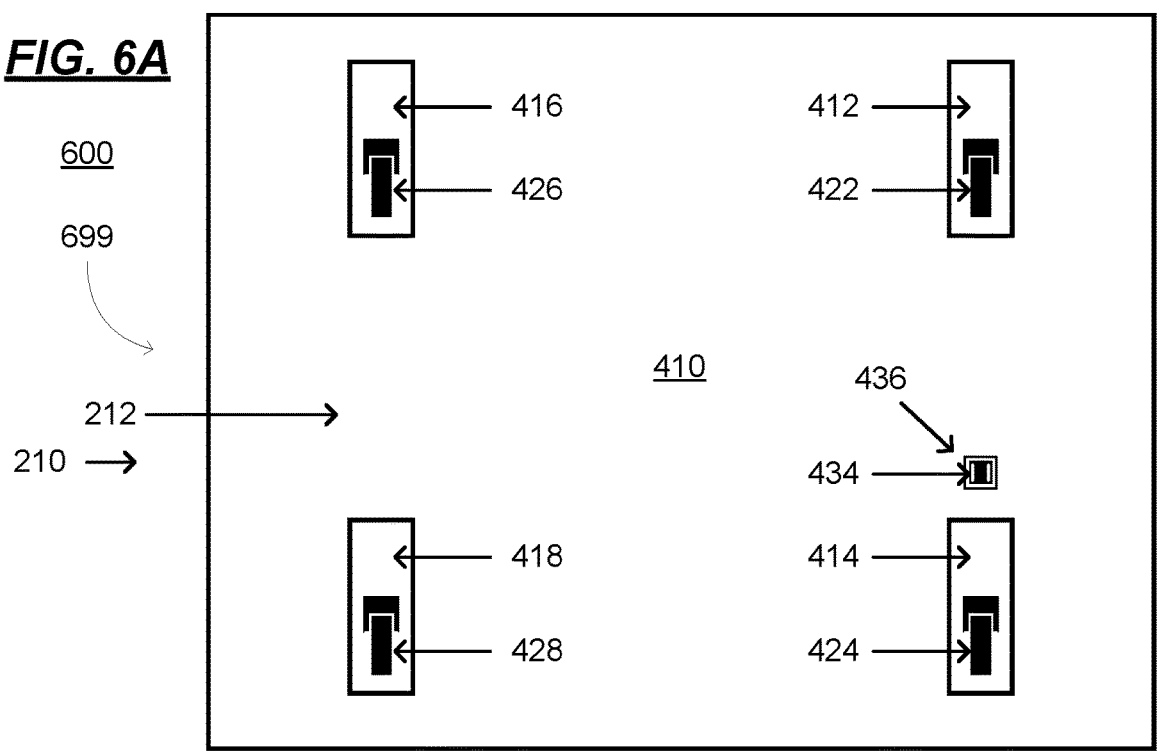
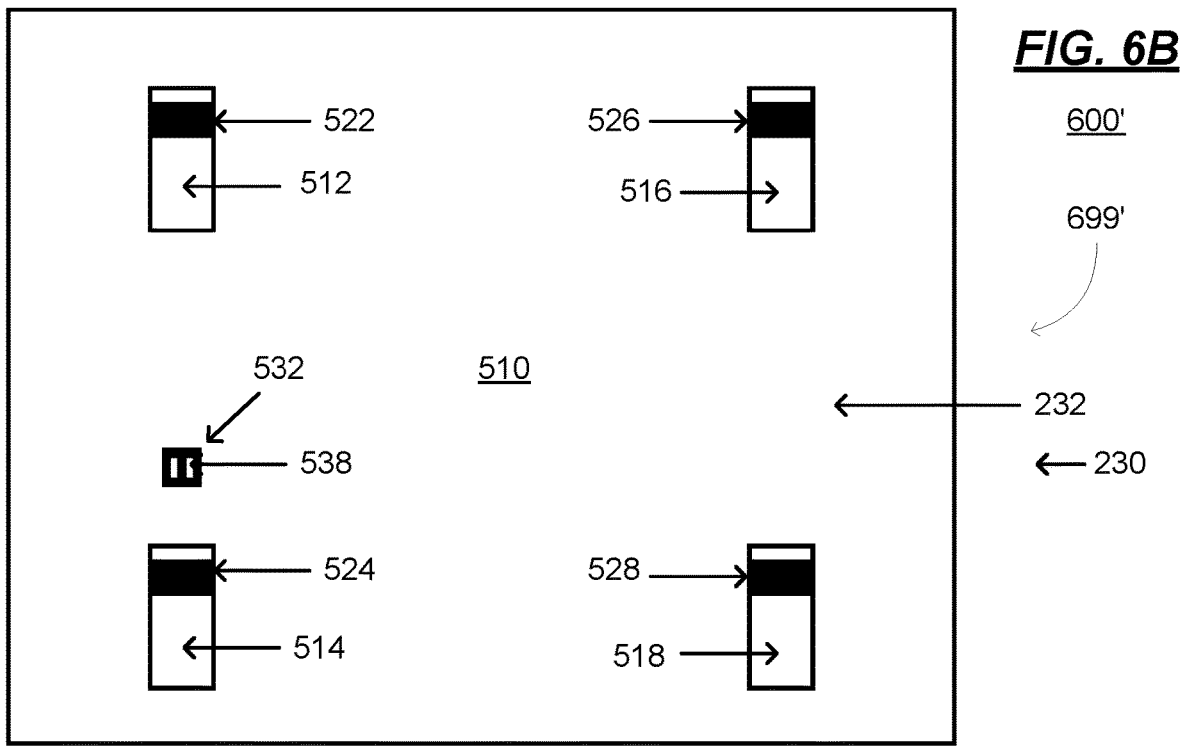

700a

700b

700c

900

AUTONOMOUS VEHICLE CONNECTED TOOL INTERCHANGE SYSTEMS AND METHODS

CROSS-REFERENCE TO RELATED APPLICATIONS

This application is a continuation-in-part of, claims benefit of and priority to, and incorporates by reference herein in its entirety the following: U.S. patent application Ser. No. 17/408,355, filed Aug. 20, 2021, titled "AUTONOMOUS VEHICLE CHARGING STATION".

BACKGROUND

The longtime utilization of tractors having different interchangeable tools and implements has been a mainstay in agriculture, industry, mining, construction, and other commercial endeavors for the efficiency and higher utilization that such interchangeability can bring. For example, in agriculture a tractor may be used to pull a plow, a harrow, a planter/seeder, a spreader, a sprayer, and a variety of other tools over the course of a growing season, while a combine harvester might utilize one header assembly for harvesting wheat or barley (a "grain platform") while an entirely different header assembly may be used for harvesting windrowed bluegrass seed (a "pick-up header" featuring spring-tined pickups attached to a rotating belt). Indeed, even small-size consumer tractors might utilize a centrally-connected underside mowing deck in one season and a front-mounted snow plow in another season—two implements having entirely different interconnections with the tractor but which are rarely (if ever) utilized while the other is also connected (for practical reasons).

With the more recent utilization of autonomous vehicles and other robots, the utilization of interchangeable tools can be similarly valuable and prudent. However, while autonomous vehicles and other robots may be able to operate somewhat autonomously (without real-time human guidance or supervision) once properly configured with the desired connectable tool, changing tools still requires human assistance, directly or indirectly, for autonomous operations in all but the most consistent and predictable environments. Indeed, for operations in undefined, dynamic, and changing environments—particularly in outdoor environments that lack specific dedicated infrastructure for tool interchange—interchangeable tools necessarily require direct or indirect human assistance each time a new tool needs to be interconnected to a tractor. This is especially true for tools that need to physically connect to the tractor not just to provide movement of the tool (e.g., a plow) but that also need electrical, hydraulic, or other provisioning needs (e.g., for tool power), and particularly so because of the safety challenges, risks, and dangers that can arise when such connections are made without human supervision in an uncontrollable environment. For these reasons, interconnecting a tool to a tractor—and especially an autonomous vehicle that otherwise operates substantially or fully autonomously (without real-time human interaction or supervision during operations) in an outdoor environment—is a significant limitation and inefficiency on the operation of said tractor with regard to any ability for autonomously utilizing different connectable tools.

SUMMARY

Various implementations disclosed herein are directed to an autonomous vehicle capable of interconnecting with various connectable tools in dynamic outdoor environments that lack specific dedicated infrastructure for tool interchange and for connectable tools requiring both physical and power-transfer connections.

More specifically, disclosed herein are various implementations directed to systems, processes, apparatuses, methods, computer-readable instructions, and other implementations for an autonomous vehicle to autonomously interconnect with a connectable tool comprising: aligning the autonomous vehicle for interconnecting with the connectable tool based on a location and an orientation of the connectable tool; engaging the connectable tool at one or more physical connection points and at least one electrical connection point; and establishing power line modem (PLM) communications between the autonomous vehicle and the connectable tool via an electrical power connection resulting from engaging the at least one electrical connection point.

Several such implementations may further comprise: re-engaging the at least one electrical connection point if the power line modem (PLM) communications cannot be established; determining that the electrical power connection is without current diversion before commencing full power operations over said electrical power connection; determining, prior to the aligning, the location corresponding to a connectable tool and/or the orientation for interconnecting with the connectable tool; after the establishing, releasing at least one braking mechanism on the connectable tool; and/or aligning the autonomous vehicle for interconnecting with a supplemental connectable tool based on a supplemental location and a supplemental orientation of the supplemental connectable tool, engaging the supplemental connectable tool at a supplemental-tool physical connection point and a supplemental-tool electrical connection point, and establishing power line modem (PLM) communications between the autonomous vehicle and the supplemental connectable tool via a supplemental-tool electrical power connection.

Certain such implementations may further comprise one of more of the following features whereby: the electrical power connection is formed at the at least one electrical connection point by a set of autonomous vehicle contacts physically contacting, with a biasing force or pressure, a corresponding set of connectable tool contacts; determining that the electrical power connection is without current diversion comprises (a) transmitting a fixed amount of non-lethal electrical power from the autonomous vehicle to the connectable tool via the electrical power connection, and (b) determining whether the difference between the power transmitted by the autonomous vehicle and the power received by the connectable tool exceeds a threshold for indicating current diversion; the connectable tool is operated by the autonomous vehicle as a floating platform, and/or the supplemental connectable tool is operated by the autonomous vehicle as a towed platform; the engaging is performed by an elevating connection component of the autonomous vehicle that is capable of operating at least one connectable tool as a floating platform; engaging the connectable tool at one or more physical connection points comprises utilization, by the autonomous vehicle, of at least one hook-and-lock connection mechanism; engaging the connectable tool at one or more physical connection points comprises first-engaging the connectable tool at one or more primary connection points, and second-engaging the connectable tool at one or more secondary connection points by the autonomous vehicle rotatably vertical-lifting the connectable tool at the one or more primary connection points; wherein, after the first-engaging, the engaging the at least one electrical connection point is performed by the autonomous vehicle rotatably vertical-lifting the connectable tool at the one or more primary connection points; the engaging is performed by a partially-rotatable connection component of the autonomous vehicle that is capable of operating at least one connectable tool as a towed platform; the partially-rotatable connection component further comprises a fixable engagement component for guided insertion into a first physical connection point of the connectable tool, and/or a flexible engagement component, capable of partial-rotatability, operationally coupled to the fixable engagement component and to the autonomous vehicle; the engaging the connectable tool at the one or more physical connection points contemporaneously engages the connectable tool at the at least one electrical connection points through the fixable engagement component; engaging the connectable tool at one or more physical connection points comprises utilization, by the autonomous vehicle, of at least one hitch-and-lock connection mechanism; and/or the at least one connectable tool comprises at least one device from among the following group of devices: a fixed floating platform, a configurable floating platform, a mower, a trimmer, an edger, a sprayer, a leaf blower, a snow blower, a debris blower, a sensing device, an inspection device, a surveillance device, a lighting device, an install device, an uninstall device, a foreign object detection device, a foreign object removal device, a radar device, a sonar device, a vacuum device, a digging device, a scooping device, a grabbing device, a sawing device, a chopping device, a hammering device, a jack-hammering device, a surface-coating device, an excavator, a bucket, a water carrier, a fuel carrier, a recharge platform, a solar platform, a luggage carrier, a tool carrier, a foreign object removal store, a material moving store, a trailer, a wagon, or a towed platform.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary and the following detailed description of illustrative implementations are better understood when read in conjunction with the appended drawings. For the purpose of illustrating the implementations, there is shown in the drawings example constructions of the implementations; however, the implementations are not limited to the specific methods and instrumentalities disclosed. In the drawings:

FIG. 3A is a simplified side view of the autonomous vehicle of FIG. 2A and FIG. 2B further comprising a second interconnect interface and, separately, a second connectable tool comprising a second connection interface that are representative of the various implementations disclosed herein;

FIG. 3B is a simplified top view of the autonomous vehicle and the second connectable tool of FIG. 3A that are representative of the various implementations disclosed herein;

FIG. 4A is a simplified side view of the autonomous vehicle of FIG. 2A, FIG. 2B, FIG. 3A, and FIG. 3B interconnected to both the connectable tool and to the second connectable tool representative of the various implementations disclosed herein;

FIG. 4B is a simplified top view of the autonomous vehicle interconnected to both the connectable tool and to the second connectable tool of FIG. 4A representative of the various implementations disclosed herein;

FIG. 5A is a modified block diagram comprising simplified cutaway side views of an exemplary interconnect interface for an autonomous vehicle and its corresponding exemplary connection interface for a connectable tool that are representative of the various implementations disclosed herein;

FIG. 5B is a modified block diagram comprising simplified cutaway top views of the exemplary interconnect interface and exemplary connection interface from FIG. 5A that are representative of the various implementations disclosed herein;

FIG. 6A is a modified block diagram comprising a front view of the exemplary interconnect interface (affixed to the autonomous vehicle) shown in FIG. 5A and FIG. 5B that is representative of the various implementations disclosed herein;

FIG. 6B is a modified block diagram comprising a front view of the exemplary connection interface (affixed to the connectable tool) shown in FIG. 5A and FIG. 5B that is representative of the various implementations disclosed herein;

DETAILED DESCRIPTION

Disclosed herein are various implementations directed to an autonomous vehicle capable of interconnecting with various connectable tools in dynamic outdoor environments that lack specific dedicated infrastructure for tool interchange and for connectable tools requiring physical, communicative, and/or power-transfer connections.

An understanding of various concepts is helpful toward a broader and more complete understanding of the various implementations disclosed herein, and skilled artisans will readily appreciate the implications these various concepts have on the breadth and depth of the various implementations herein disclosed. Certain terms used herein may also be used interchangeably with other terms used herein and such terms should be given the broadest interpretation possible unless explicitly noted otherwise.

Autonomous Vehicles

Various implementations disclosed herein relate to autonomous vehicles (or "robots") such as, for example, mobile maintenance robots, autonomous mowers, or other such vehicles and devices that might be utilized for any purpose such as, for example, maintenance operations at renewable energy installations. Even in this narrow but representative example, however, such maintenance operations may include a diverse range of activities and tasks including without limitation mowing, spraying for pests, spraying insecticides, washing of solar panels, security monitoring of the area, replacement of failed components, or other maintenance operations including but not limited to inspections of combiner boxes, wire connections, or infrastructure (including solar panels), and where any such "inspections" may be performed with multispectral cameras capturing image data within specific wavelength ranges across the electromagnetic spectrum.

For the various implementations herein disclosed, an autonomous vehicle may comprise a variety of sensors, such as (but not limited to) lidar (light detection and ranging), radar (Radio Detection and Ranging), IMU (inertial measurement unit), inertial navigation systems, temperature sensors, humidity sensors, noise sensors, accelerometers, pressure sensors, GPS (global positioning system), ultrasonic sensors, cameras, or other sensors. Lidar may include, in some examples, 3D laser scanning, or a combination of 3D scanning and laser scanning. The autonomous vehicle may implement autonomous navigation to traverse a work area using sensors for collision avoidance and adjusting routing as needed. The autonomous vehicle may be communicatively connected to a central management system through a GPRS (General Packet Radio Service) network or other cellular data network or cell-based radio network technology mobile network, an IEEE 802.11x wireless network or any other network modality. Any number of networks (of the same or different types) may be present and used in any combination suitable for performing any one or more of the methodologies described herein.

Figure 1A:
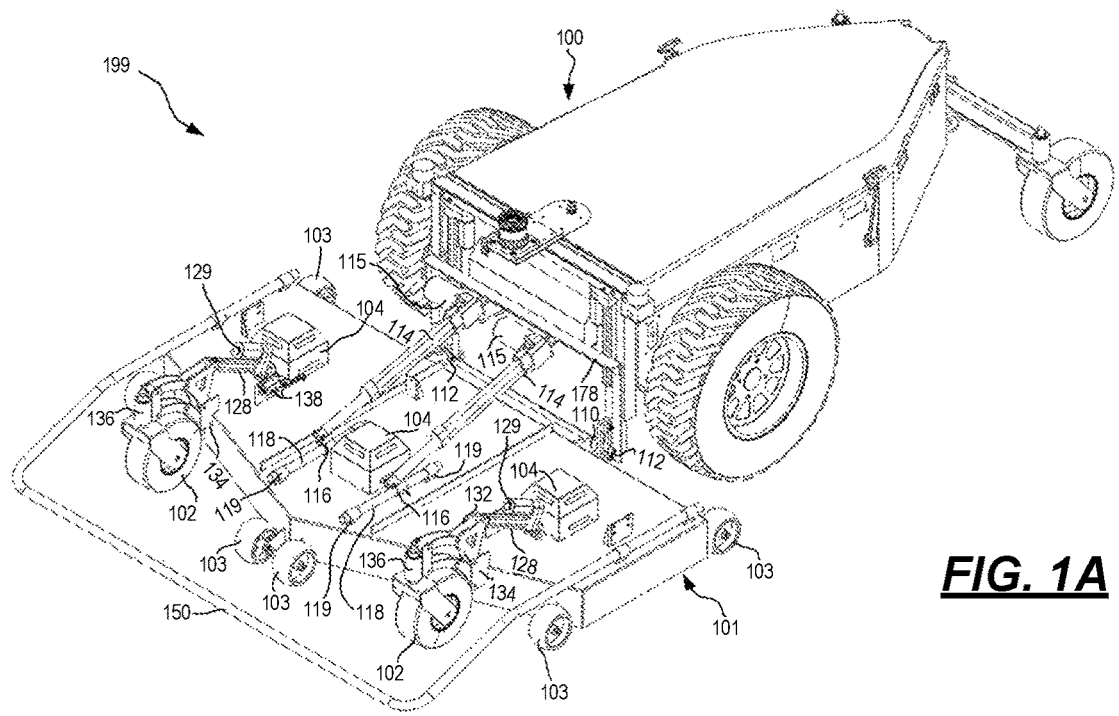
FIG. 1A is a diagrammatic illustration of an autonomous mower—specifically, an oblique front view of an autonomous mower that comprises tractor and a mowing deck—as an exemplary implementation of an autonomous vehicle representative of the various implementations disclosed herein.
Figure 1B:
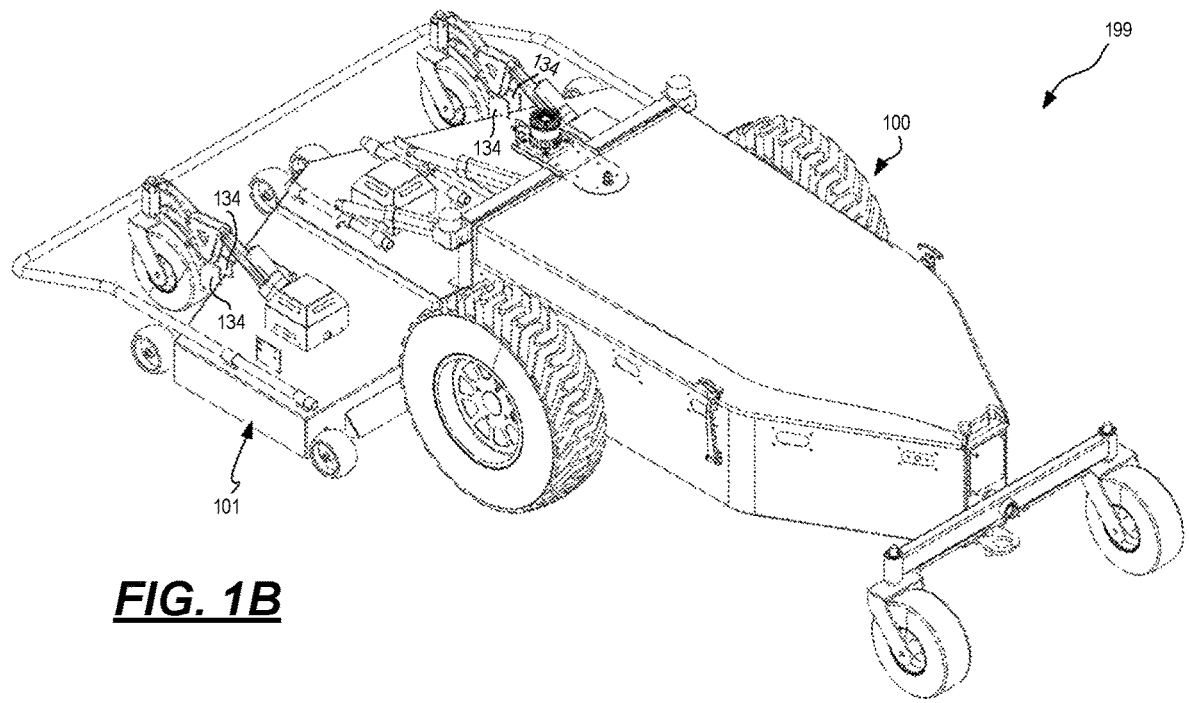
FIG. 1B is a second diagrammatic illustration of an autonomous mower of FIG. 1A—specifically, an oblique rear view of an autonomous mower that comprises tractor and a mowing deck—as an exemplary implementation of an autonomous vehicle representative of the various implementations disclosed herein.

FIG. 1A is a diagrammatic illustration of an autonomous mower—specifically, an oblique front view of an autonomous mower 199 that comprises tractor 100 and a mowing deck 101—as an exemplary implementation of an autonomous vehicle representative of the various implementations disclosed herein. FIG. 1B is a second diagrammatic illustration of the autonomous mower of FIG. 1A—specifically, an oblique rear view of an autonomous mower that comprises a tractor and a mowing deck—as an exemplary implementation of an autonomous vehicle representative of the various implementations disclosed herein. For clarity and convenience, FIG. 1A and FIG. 1B may be referred to collectively as "FIG. 1" herein.

In FIG. 1, autonomous mower 199 may include one or more blades disposed below a mowing deck 101. The mowing deck may comprise a number of non-supporting wheels including contact wheels 102 (which sense height above the ground) and other high-mounted wheels 103 that prevent the edges of the mowing deck from bottoming out and scraping uneven ground (as well as provide resting support when the mowing deck is detached from the tractor). Power may be provided through electrical connections to motors 104 on mowing deck 101 to drive the mower blades.

Mowing deck 101 may be adapted to provide for low-profile mowing that can pass under solar panels, even when the solar panels are positioned close to the ground and the tractor cannot drive under them. Mowing deck 101 may be disposed forward of tractor 100 and outside of the wheels of tractor 100, and thus tractor 100 might drive the mowing deck 101 into spaces which tractor 100 itself cannot go, such as under panels that are lower to the ground than the top of tractor 100. The form factor of the mowing deck may be selected to achieve a desired cutting width and profile. Mowing deck 101 may be otherwise configured to have a larger or smaller width, to work in different clearances and to have different mowing heights.

The rear of mowing deck 101 may be mounted to tool mounting bracket 178 using a hinged connection such that the front of mowing deck 101 can be tilted up. For example, mowing deck 101 may include rearwardly extending hinge members 110. Hinge pins 112 may extend laterally from hinge members 110 to pass through the respective hinge pin openings. Hinge pins 112 may comprise bolts that pass-through hinge members 110 and corresponding side plates. The hinge pins 112 may define an axis of rotation for tilting mowing deck 101 relative to tractor 100.

Additionally, mowing deck 101 may be coupled to tool mounting bracket 178 by tilt actuators 114, which are linear actuators driven by electric motors 115. A first end of each tilt actuator 114 may be rotatably coupled to tool mounting bracket 178 at various attachment points. The second end of each tilt actuator 114 (e.g., the end of the drive tube) may be connected to the top of mowing deck 101 by a slidable connection or other connection that allows translation. More particularly, guiderails 118 may be attached to and spaced from the top surface of mowing deck 101 (e.g., by standoffs 119) and the second end of each tilt actuator may be coupled, at a rotatable connection, to a sleeve 116 that is translatable along the respective guiderail 118. Biasing members, such as springs disposed about the guiderails 118, may be provided to bias the sleeves 116 forward or rearward.

Autonomous mower 199 thus may include a lift and tilt mowing deck 101. Retracting and extending lift actuators may lift and lower tool mounting bracket 178 and hence mowing deck 101. Retracting tilt actuators 114 may tilt the front end of mowing deck 101 up and extending tilt actuators 114 may lower the front end of mowing deck 101. As discussed above, the capability to lift/tilt the mowing surface may provide a mobile automated maintenance system the enhanced capability to adapt to different contours of the ground and thereby may provide the advantage of level cutting of vegetation by the mowing system. Moreover, the capability to tilt the mowing deck 101 may increase the ease of maintenance and may provide an operator easy access to replace or maintain the mowing blades.

Mowing deck 101 may also include contact wheels 102 that may be operationally coupled to contact wheel actuators 128 (e.g., by linkages 132). Contact wheel actuators 128, which may be linear actuators driven by electric motors 129, may be actuated to maintain contact between contact wheels 102 and the ground and in some cases to maintain a desired amount of deck front pressure (e.g. pressure between wheels 102 and the ground). Moving wheels to maintain a desired amount of contact may allow mowing deck 101 to better follow the contour of the ground or to allow wheels 102 to continue to provide support at the front portion of mowing deck 101 when mowing deck 101 is lifted by lift actuators. Moreover, maintaining pressure on contact wheels 102 may be used to help regulate the traction of drive wheels and, as discussed earlier herein, to sense anomalies in the ground that could be obstacles to navigation representative of various implementations herein disclosed.

In addition, a first end of each contact wheel actuator 128 may be rotatably coupled to the top of mowing deck 101. The second end of each contact wheel actuator 128 (e.g., the end of the drive tube, in the illustrated embodiment) may be rotatably coupled to a respective linkage 132. A first end of each linkage may be rotatably coupled to the front of mowing deck 101. The end of each linkage 132 may then capture a pin or other member disposed between a respective pair of forwardly extending plates 134. The distal end of each linkage 132 may include a collar 136 with an internal bushing to receive the shank of a respective contact wheel caster. Extending contact wheel actuators 128 may cause the respective linkages 132 to rotate, pushing the respective contact wheels 102 down. Retracting contact wheel actuators 128 may cause the respective linkages 132 to rotate and pull the respective contact wheels 102 up relative to mowing deck 101.

Mowing deck 101 may include a variety of sensors, such as sensors 138 to measure the frontside pressure at contact wheels 102 (one sensor 138 is visible in FIG. 1A, but a similar sensor can be provided for the other contact wheel). Rotary sensors may be used to output an indication of the amount of contact, and other sensors may also be used. The output of sensors 138 may be used for active control of mowing deck and provide information about the terrain usable in future control decisions.

Mowing deck 101 may include a bump bar 150 which may incorporate a sensor to indicate that autonomous mower 199 has run into an obstacle. Bump bar 150 may also incorporate a kill switch such that autonomous mower 199 will stop the blades, stop moving, shut down, or take other action in response to bump bar 150 bumping into an obstacle with a threshold amount of force. The various motors and sensors associated with mowing deck 101 may be electrically connected to controllers in the main body.

Notably the mowing deck 101 may be cantilevered (or substantially cantilevered) instead of or in addition to being minimally supported by contact wheels 102 or other deck wheels 103, in which case the contact wheels 102 might be utilized primarily for sensing holes, edges, and other obstacles in accordance with the various implementations disclosed herein.

For certain implementations, mowing deck 101 can connect to tractor 100 using a tool mounting bracket such as tool mounting bracket 178 that may be slidably coupled to a tractor 100. Mowing system 100 may also include lift actuators to lift the mowing deck 101 and tilt actuators 114 to tilt the mowing deck 101. It can be noted then the lift and tilt actuators can be independently controlled to provide increased control over the pitch (rotation about a lateral (side-to-side) axis) and roll (rotation about a longitudinal (front-to-rear) axis) of the mowing deck and the autonomous vehicle can be controlled to control the yaw (rotation about the vertical axis) of the mowing deck. It can be further noted that in some implementations, all of the motors, actuators in an autonomous vehicle or automated maintenance system may be electrical thus eliminating the possibility of hydraulic oil leaks that is present if hydraulic actuators are used.

However, despite the many advantages and benefits of the innovative autonomous mower described above, the combination of tractor and mowing deck favors dedicated use as an autonomous mower primarily because automated substitution of a different tool for the mower deck at an operating site is not readily supported by this design. Accordingly, enhancements to the foregoing designs to enable such additional functionality are reflected in the various implementations disclosed herein.

Connectable Tools

Various implementations disclosed herein are directed to an autonomous vehicle capable of interconnecting with various connectable tools in dynamic outdoor environments that lack specific dedicated infrastructure for tool interchange and for connectable tools requiring physical, communicative, and/or power-transfer connections. Moreover, although some tools may be self-powered (or not powered at all), and therefore might not utilize a power-transfer connection, PLM or other wired communications occurring there-between may still be desired; and, conversely, even if PLM or other wired communications are not necessary or utilized, some form of power transfer may still be desired. Accordingly, the various implementations disclosed herein for providing both power and communication may also be utilized, in whole or in part, for applications that require only power or only communications, and nothing herein should be deemed to be limiting the application of the inventive features to just implementations requiring both power and communications.

The various implementations disclosed herein are specifically directed to an autonomous vehicle operating autonomously, that is, without required communications with additional systems or direct intervention by humans or other robots for specific performance of the interconnect operation. In other words, while data may be received before or after an interconnect operation, and while a connectable tool may be emplaced at the operating site by other systems or persons, the various implementations herein disclosed are directed to an autonomous vehicle operating autonomously to interconnect with a connectable tool and, as such, such implementations are entirely distinguishable from autonomous vehicles that, although perhaps operating autonomously for other operations once tools are connected, do not operate autonomously to interconnect with interchangeable tools.

Figure 2A:
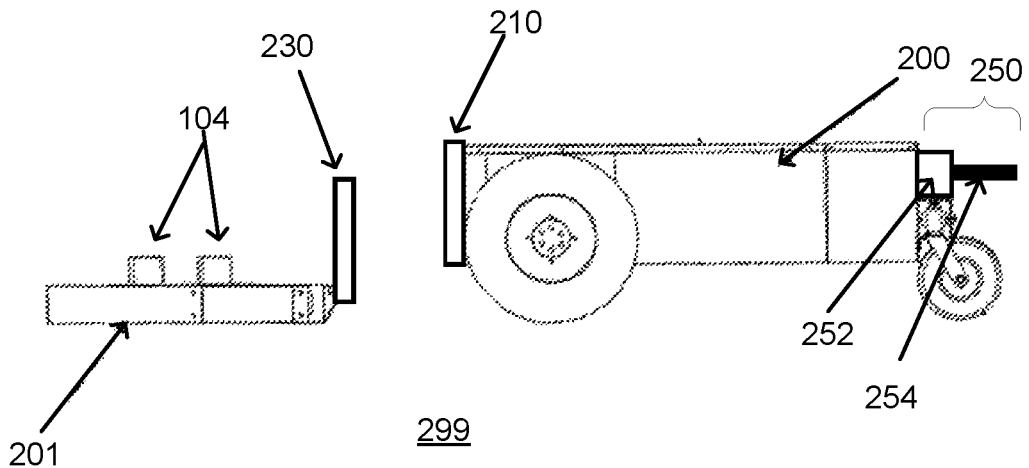
FIG. 2A is a simplified side view of an autonomous vehicle comprising an interconnect interface and, separately, a connectable tool comprising a connection interface that are representative of the various implementations disclosed herein.
Figure 2B:
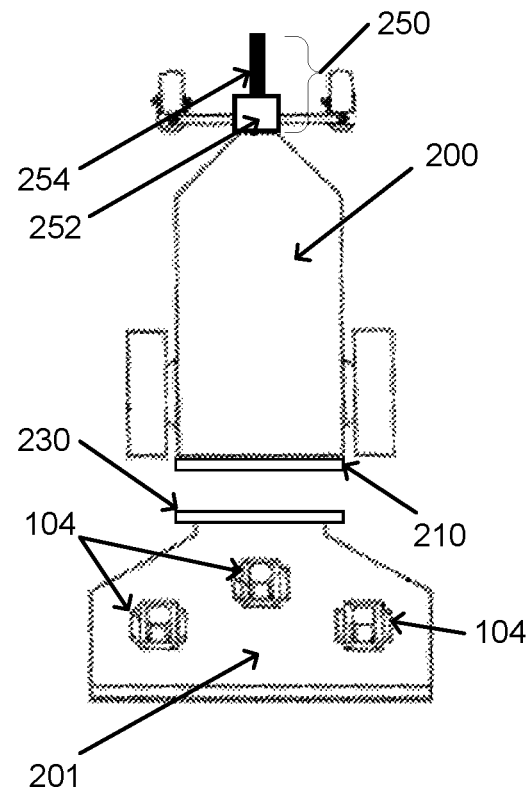
FIG. 2B is a simplified top view of the autonomous vehicle and the connectable tool of FIG. 2A that are representative of the various implementations disclosed herein.

FIG. 2A is a simplified side view 299 of an autonomous vehicle 200 (e.g., a "tractor") comprising an interconnect interface 210 and, separately, a connectable tool 201 comprising a connection interface 230 (sometimes referred to more simply as a "connect interface" or "connection") that are representative of the various implementations disclosed herein. FIG. 2B is a simplified top view 299' of the autonomous vehicle 200 and the connectable tool 201 of FIG. 2A that are representative of the various implementations disclosed herein. For clarity and convenience, FIG. 2A and FIG. 2B may be referred to collectively as "FIG. 2" herein.

As shown in FIG. 2, and as further disclosed in greater detail later herein, the interconnect interface 210 corresponds to and operationally compliments the connection interface 230 insofar as being able to achieve both a physical connection and a power connection between the autonomous vehicle 200 and the connectable tool 201, the latter of which further comprise motors 104 which require power from the autonomous vehicle 200 to operate. Additionally, for any of the various implementations herein disclosed, the electrical power connection may be formed at the electrical connection point by a set of autonomous vehicle contacts physically contacting, with a biasing force or pressure, a corresponding set of connectable tool contacts.

For the various implementations disclosed herein, and when both are co-located at an operating site, the autonomous vehicle 200 may detect and identify the connectable tool 201, determine its location and orientation, and then align itself (that is, maneuver itself into a correct position and orientation) to physically and/or electrically engage the connectable tool 201 for utilization thereof. The autonomous vehicle 200 may detect and identify the connectable tool 201 and determine its location and orientation based on any of several different determining means including its own sensor readings alone or supplemented by data communicatively provided previously by another entity such as a centralized control facility, another autonomous vehicle, or the connectable tool 201 itself (e.g., an RFID tag, readable markings, or other features intended to be and/or capable of being sensed by the autonomous vehicle 200).

Also shown in FIG. 2 is a second interconnect interface 250 operationally coupled to the autonomous vehicle 200, said second interconnect interface 250 comprising a base 252 operationally coupled to an extension 254 which will be described in more detail with regard to FIG. 3A and FIG. 3B, said second interconnect interface 250 being capable of engaging a second connectable tool (not shown).

For certain implementations herein disclosed, the connectable tool 201 may be a floating platform that is physically elevated by the autonomous vehicle 200 for operation and/or may comprise its own elevating or angling means in addition to any such capabilities provided by said autonomous vehicle 200.

FIG. 3A is a simplified side view 399 of the autonomous vehicle 200 of FIG. 2 further comprising a second interconnect interface 250 and, separately, a second connectable tool 302 (e.g., a "wagon" or "load hauler") comprising a second connection interface 270 that are representative of the various implementations disclosed herein. FIG. 3B is a simplified top view 399' of the autonomous vehicle 200 and the second connectable tool 302 of FIG. 3A that are representative of the various implementations disclosed herein. For clarity and convenience, FIG. 3A and FIG. 3B may be referred to collectively as "FIG. 3" herein.

As shown in FIG. 3, and as further disclosed in greater detail later herein, the second interconnect interface 250 corresponds to and operationally compliments the second connection interface 270 insofar as being able to achieve both a physical connection and a power connection between the autonomous vehicle 200 and the second connectable tool 302, the latter of which may require power from the autonomous vehicle 200 to operate at least some feature (for example, a "dumping" or "unloading" action). As shown in FIG. 3, the exemplary second connectable tool 302 may comprise a plurality of wheels 312 coupled to a container 310, having a containing space 320, to which the second connection interface 270 may also be coupled. The second connection interface 270, in turn, may comprise a mount 272 operationally coupled to a receiver 274, the latter of which being capable of physically and/or electrically engaging the extension 254 of the autonomous vehicle 200.

For the various implementations disclosed herein, and when both are co-located at an operating site, the autonomous vehicle 200 may detect and identify the second connectable tool 302, determine its location and orientation, and then align itself (that is, maneuver itself into a correct position and orientation) to physically and/or electrically engage the second connectable tool 302 (for utilization thereof) via its second interconnect interface 250 operationally coupling with the second connection interface 270. To this end, the autonomous vehicle 200—similar to its operations described above with respect to FIG. 2—may detect and identify the second connectable tool 302 and determine its location and orientation based on any of several different determining means including its own sensor readings alone or supplemented by data communicatively provided previously by another entity such as a centralized control facility, another autonomous vehicle, or the connectable tool 201 itself (e.g., an RFID tag, readable markings, or other features intended to be and/or capable of being sensed by the autonomous vehicle 200).

For certain implementations herein disclosed, the second connectable tool 302 may be a "towable tool" such that the interconnection between the second connectable tool 302 and the autonomous vehicle 200 is at least a partially-rotatable connection, achieved by a partially-rotatable connection component of either the autonomous vehicle, the second connectable tool, or both, and akin to a reasonable degree of free movement, both horizontally and vertically, inherent to contemporary towed connections for trailers, wagon, containers, recreational vehicles, and so forth that permit for such free movement.

FIG. 4A is a simplified side view 499 of the autonomous vehicle 200 of FIG. 2 and FIG. 3 interconnected to both the connectable tool 201 and to the second connectable tool 302 representative of the various implementations disclosed herein. FIG. 4B is a simplified top view 499' of the autonomous vehicle 200 interconnected to both the connectable tool 201 and to the second connectable tool 302 of FIG. 4A representative of the various implementations disclosed herein. For clarity and convenience, FIG. 4A and FIG. 4B may be referred to collectively as "FIG. 4" herein.

Although the second interconnect interface 250 and second connection interface 270 of FIG. 3 are shown to be distinguishable from the interconnect interface 210 and connection interface 230 of FIG. 2—and which are together also reflected here in FIG. 4—for certain alternative implementations these connection interfaces may be the same in nature, function, or operation, that is, the second interconnect interface 250 may be of the same kind or type as the interconnect interface 210 and the second connection interface 270 may be of the same kind or type as the connection interface 230 and, as such, may permit a connectable tool (and/or second connectable tool) to be interconnected with the autonomous vehicle via the interconnect interface or the second (otherwise identical or at least compatible) second interconnect interface. Stated differently, although FIG. 2 and FIG. 3 may suggest that the interconnection between the autonomous vehicle 200 and the connectable tool 201 is different than the interconnection between the autonomous vehicle 200 and the second connectable tool 302, nothing herein is intended to limit the implementations disclosed herein to such a difference and instead encompasses an autonomous vehicle using two or more identical or compatible interconnect interfaces that are each capable of interconnecting with at least one specific connectable tool. Moreover, such alternative implementations disclosed herein are intended to include the interconnection of two or more towable tools (e.g., two wagons) which can be interconnected with the autonomous vehicle to be either pulled or pushed thereby accordingly. Likewise, nothing herein should be interpreted as limiting or being dependent upon operation of a connectable tool to operation of a second connectable tool or vice versa as such operation, while perhaps interdependent for some implementations, may be entirely independent for other operations.

FIG. 5A is a modified block diagram 500 comprising simplified cutaway side views 500 of an exemplary interconnect interface 210 for an autonomous vehicle 200 and its corresponding exemplary connection interface 230 for a connectable tool 201 that are representative of the various implementations disclosed herein. FIG. 5B is a modified block diagram 500' comprising simplified cutaway top views 500' of the exemplary interconnect interface 210 and exemplary connection interface 230 from FIG. 5A that are representative of the various implementations disclosed herein. For clarity and convenience, FIG. 5A and FIG. 5B may be referred to collectively as "FIG. 5" herein.

FIG. 6A is a modified block diagram 600 comprising a front view 699 of the exemplary interconnect interface 210 of FIG. 5 (affixed to the autonomous vehicle, not otherwise shown) representative of the various implementations disclosed herein. FIG. 6B is a modified block diagram 600' comprising a front view 699' of the exemplary connection interface 230 of FIG. 5 (affixed to the connectable tool, not otherwise shown) representative of the various implementations disclosed herein. For clarity and convenience, FIG. 6A and FIG. 6B may be referred to collectively as "FIG. 6" herein.

As shown in FIG. 5 and FIG. 6, the interconnect interface 210 may comprise an interconnect structure 212 having an expressed face 410 and a plurality of openings 412, 414, 416, and 418 through which horizontal- and vertical-moving hooks 422, 424, 426, and 428, extending from an undefined or variable embedded space 408 (shown as a dotted-line) from within the navigational vehicle 200, may moveably operate as described later herein. The interconnect interface 210 may further comprise at least one channel 436 through which a slidable power-providing connection 434, comprising power contacts 432 and also extending from an embedded space 408 from within the navigational vehicle 200, may moveably operate as described later herein.

As further shown in FIG. 5 and FIG. 6, the connection interface 230 may comprise a connect structure 232 having an exposed face 510 and a plurality of recesses 512, 514, 516, and 518 within which lateral bars 522, 524, 526, and 528 are firmly affixed, said bars extending from within the connect structure 232 through said recesses, and whereby said bars thereby provide a connectable surface for said aforementioned hooks. The connection interface 230 may further comprise at least one receptacle 532 comprising a power receiver 538 having power-receiving contact points (not shown) for electrically engaging the power contacts 432 of the power-providing connection 434 when slidably engaged as described later herein.

Figure 7A:
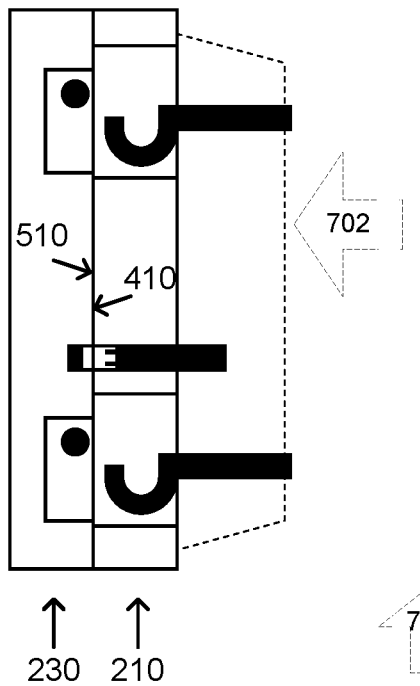
FIG. 7A is a first in-operation cut-away side view of the interconnect interface physically contacting the connection interface.
Figure 7B:
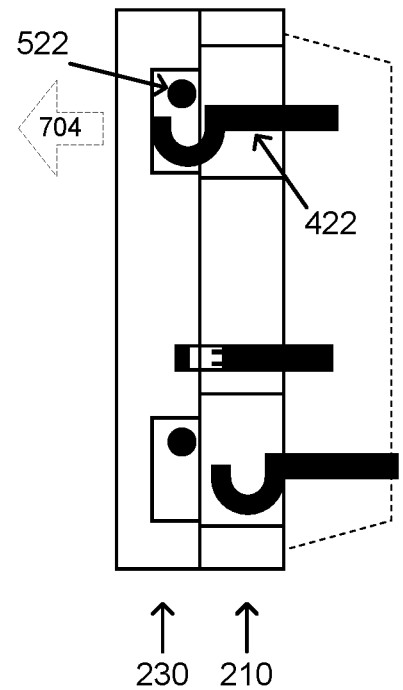
FIG. 7B is a second in-operation cut-away side view of the interconnect interface extending its upper hooks into the connection interface.
Figure 7C:
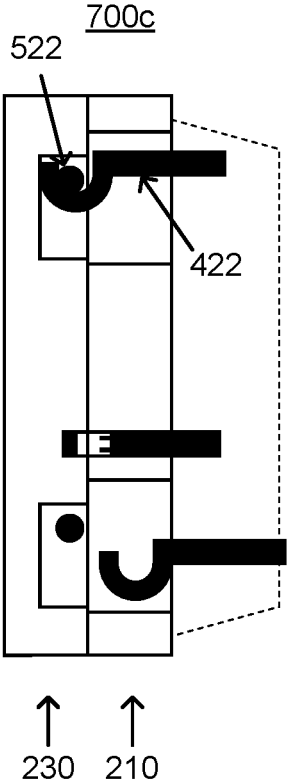
FIG. 7C is a third in-operation cut-away side view of the interconnect interface engaging the upper bars of the connection interface with the upper hooks.
Figure 7D:
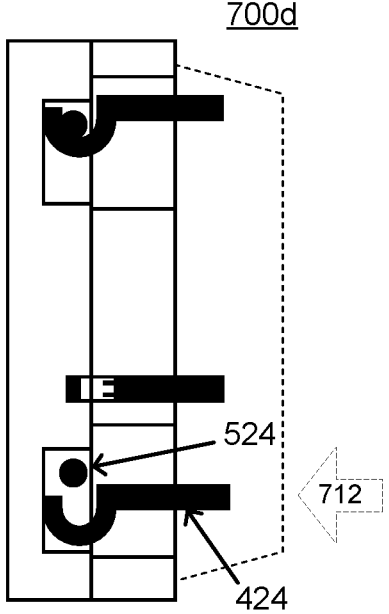
FIG. 7D is a fourth in-operation cut-away side view of the interconnect interface extending its lower hooks into the connection interface.
Figure 7E:
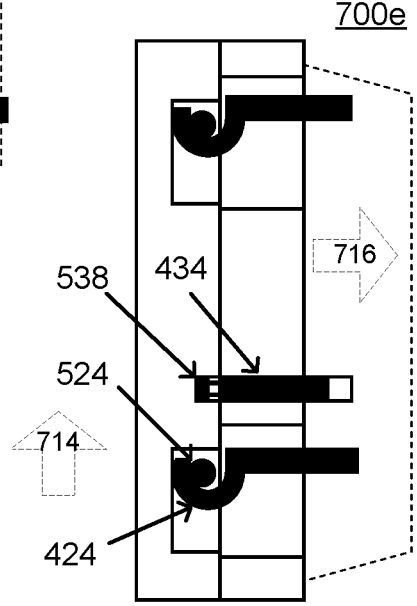
FIG. 7E is a fifth in-operation cut-away side view of the interconnect interface engaging the lower bars of the connection interface with the lower hooks.

FIG. 7A is a first in-operation cut-away side view 700a of the interconnect interface 210 aligning with and at least partially physically contacting the connection interface 230. FIG. 7B is a second in-operation cut-away side view 700b of the interconnect interface 210 extending its upper hooks 422 and 426 into the upper recesses 512 and 514 of the connection interface 230. FIG. 7C is a third in-operation cut-away side view 700c of the interconnect interface 210 engaging the upper bars 522 and 526 of the connection interface 210 with the upper hooks 422 and 426. FIG. 7D is a fourth in-operation cut-away side view 700d of the interconnect interface 210 extending its lower hooks 424 and 428 into the connection interface 230. FIG. 7E is a fifth in-operation cut-away side view 700e of the interconnect interface 230 engaging the lower bars 524 and 528 of the connection interface 230 with the lower hooks 424 and 428. For clarity and convenience, FIG. 7A and FIG. 7B and FIG. 7C and FIG. 7D and FIG. 7E may be referred to collectively as "FIG. 7" herein.

As shown in FIG. 7A, the autonomous vehicle 200—having detected and identified the connectable tool 201 and aligned itself accordingly—may move (as indicated by motion direction arrow 702) such that the expressed face 410 of its interconnect interface 210 is at or near physical contact with at least a portion of the exposed face 510 of the connection interface 230 of the connectable tool 201, all of which is accomplished by the autonomous vehicle's 200 utilization of its sensing systems which may be augmented by devices (such as one or more specialized alignment cameras) specifically used for aligning at least the upper hooks 422 and 426 into position for extending into the upper recesses 512 and 516 of the connectable tool below the upper bars 522 and 526.

Although for convenience the expressed face 410 and exposed face 510 of FIG. 7A (collectively, the "faces") are shown to be in complete physical contact and alignment, in operation physical contact may be limited to the top of each face or to the bottom of each face, each somewhat angled with regard to the other, and thus having a "gap" at the end opposite where the physical contact is made (a "lower gap" or an "upper gap" respectively). Regardless, when initially engaged, the autonomous vehicle aligns itself such that the upper hooks 422 and 426 are aligned with the upper recesses 512 and 516 for engagement with the upper bars 522 and 526 as described above. Accordingly, for several implementations disclosed herein, the autonomous vehicle 200 may comprise mechanical features for rotating, angling, or otherwise moving the interconnect interface 210 relative to the autonomous vehicle 200 in addition to the autonomous vehicle's 200 own ability to together move and align itself and the interconnection interface 210 relative to the connectable tool 201 and its connection interface 230.

As shown in FIG. 7B—and after aligning itself as described above with regard to FIG. 7A—the autonomous vehicle 200 may then extend (as indicated by motion direction arrow 704) the upper hooks 422 and 426 into the upper recesses 512 and 516 of the connectable tool 201 below the upper bars 522 and 526. Then, as shown in FIG. 7C, the autonomous vehicle 200 may then lift (as indicated by motion direction arrow 706) the upper hooks 422 and 426 within the upper recesses 512 and 516 of the connectable tool 201 to loosely engage the upper bars 522 and 526 and, proceeding to lift further upward, elevate the entire connectable tool 201 up from the surface upon which it had been emplaced—and, in doing so, if there was a lower gap between the faces 410 and 510, such lower gap is effectively minimized by such swing-closing motion—such that the faces 410 and 510 thereby come into partially-complete physical contact and partial-alignment with each other (the partial being attributed to an additional distance the hooks had to extend due to any gapping between the faces). The autonomous vehicle 200 may then partially retract (as indicated by motion direction arrow 708) the upper hooks 422 and 426 to tightly engage the upper bars 522 and 526—and, in doing so, if there was an upper gap between the faces 410 and 510, such an upper gap is effectively closed—such that the faces 410 and 510 thereby come into complete physical contact and alignment with each other by such motion. In addition, one or more automated or inherent locking mechanisms of any of several different types or kinds (not shown) may be utilized or employed to help ensure that the upper hooks 422 and 426 cannot be easily separate from the upper bars 522 and 526 (said combination of hooks and locks being referred to collectively herein as one form of a "hook-and-lock connection mechanism"). The hooks used for the lifting described herein may also be termed an "elevating connection component" and, for certain implementations, the lifting for elevating the entire connectable tool may be performed by elevating the entire interconnection interface separate from and in addition to lifting the hooks.

For certain implementations, FIG. 7A, FIG. 7B, and FIG. 7C may represent a complete physical connection (i.e., via "primary connection points"), utilizing only upper hooks 422 and 426 and upper bars 522 and 526 accordingly, and some such implementations may utilize additional locking features of any of several different types or kinds (not shown) to help prevent the bottom portion of the faces from physically separating, even momentarily, during utilization. For such implementations, the electrical connection (or other corresponding power connections) may be made much the same way as described below. Nevertheless, for a more solid interconnection, other implementations may utilize lower hooks and bars as shown in FIG. 7 such as in the fashion described for FIG. 7D and FIG. 7E that follows (i.e., "secondary connection points").

As shown in FIG. 7D—and following the operations described above for FIG. 7A and FIG. 7B and FIG. 7C—the autonomous vehicle 200 may then extend (as indicated by motion direction arrow 712) the lower hooks 424 and 428 into the lower recesses 514 and 518 of the connectable tool 201 below the lower bars 524 and 528. Then, as shown in FIG. 7E, the autonomous vehicle 200 may then lift (as indicated by motion direction arrow 714) the lower hooks 424 and 428 within the lower recesses 514 and 518 of the connectable tool 201 to loosely engage the lower bars 524 and 528, and then partially retract (as indicated by motion direction arrow 716) the lower hooks 424 and 428 to tightly engage the lower bars 524 and 528. In addition, one or more automated or inherent locking mechanisms of any of several different types or kinds (not shown) may be utilized or employed to help ensure that the lower hooks 424 and 428 cannot be easily separate from the lower bars 524 and 528.

Once the physical connection and alignment are completed, the channel 436 and its slidable power-providing connection 434 are also aligned with the receptacle and its embedded power receiver 538 as shown in FIG. 7D, enabling the autonomous vehicle 200 to slidably engage (i.e., extend), as shown in FIG. 7E, said connection 434 with said receiver 538 to form an electrical connection sufficient for establishing power line modem (PLM) communications between the autonomous vehicle 200 and the connectable tool 201 and/or enabling the provision of electrical power from the autonomous vehicle 200 to the connectable tool 201. Once PLM is established, the connection can then be tested for current diversion (or equivalent) before "full power" (a.k.a. "high power" or "potentially lethal power") is provided.

Providing a high-power connection between an autonomous vehicle and any connectable tool has several challenges including but not limited to how the autonomous vehicle interconnects the connectable tool to provide said power. Although several such challenges might be avoided using wireless power exchange there between, for example, wireless powering is inherently inefficient and its limited throughput makes it generally unsuitable for most implementations disclosed herein versus power transfer by direct contacts such as physical power contacts. Yet the use of power contact has its own shortcomings such as difficulties in precision alignment necessary for such interconnecting (addressed herein) as well as the realities of outdoor operations and risks associated with precipitation, water, and other factors that could prevent successfully interfacing with a plug or result in electrical or mechanical damage (such as electrical shorts, bent contacts, etc.) or unsafe electrical discharges. Accordingly, power diversion testing is utilized by various implementations disclosed herein.

If either PLM is unsuccessful or current diversion is discovered (indicating an unsafe electrical connection), the connectable tool may be partially or fully disconnected via a reversal of the foregoing interconnection steps and then re-interconnected until PLM is achieved and/or current diversion is determined to be negative. For the various implementations herein disclosed, and before commencing full power operations over said electrical power connection, determining that the electrical power connection without unsafe current diversion may be performed by transmitting a fixed amount of non-lethal electrical power from the autonomous vehicle to the second connectable tool via the electrical power connection, and then determining whether the difference between the power transmitted by the autonomous vehicle and the power received by the second connectable tool exceeds a threshold for indicating current diversion (the testing being facilitated by PLM communications there between).

Figure 8A:
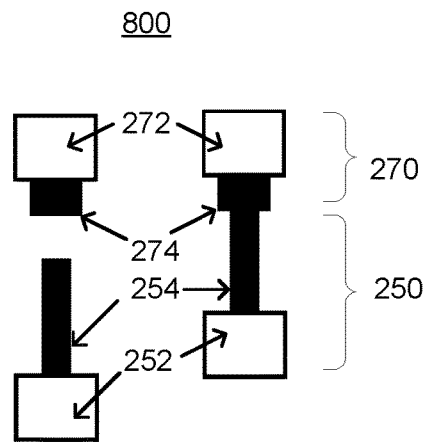
FIG. 8A is a simplified block diagram providing a side view of a general alternative interconnect interface for an autonomous vehicle and its corresponding general alternative connection interface for a connectable tool that are representative of the various implementations disclosed herein.
Figure 8B:
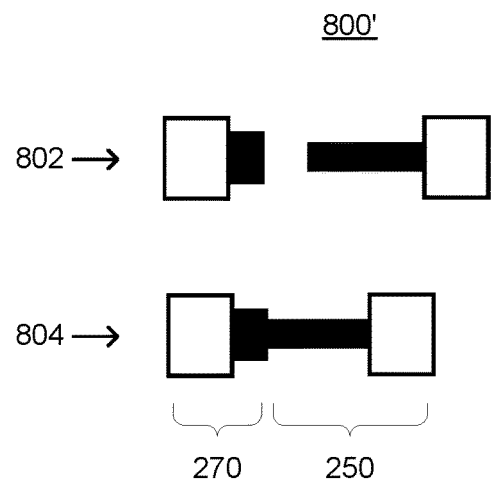
FIG. 8B is a simplified block diagram providing a top view of the general alternative interconnect interface and corresponding general alternative connection interface of FIG. 8A that are representative of the various implementations disclosed herein.
Figure 8C:
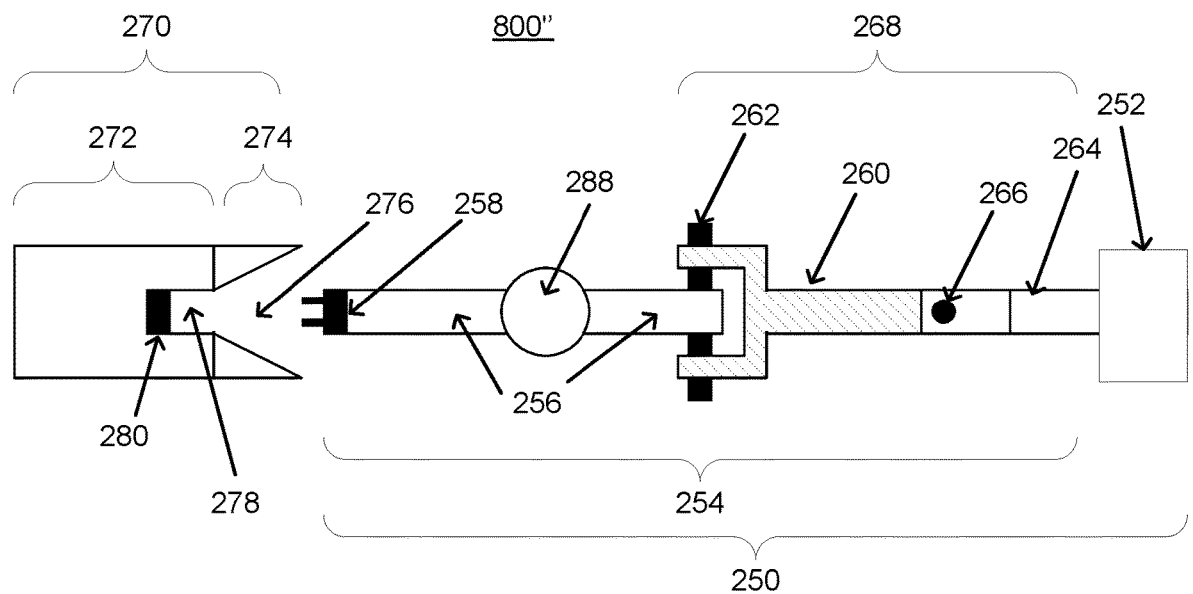
FIG. 8C is modified block diagram providing a more detailed cross-sectional lateral-rotatable view (that is, a side view and alternately a top view) of an exemplary alternative interconnect interface and corresponding exemplary alternative connection interface corresponding to those shown in FIG. 8A and FIG. 8B (and other figures) representative of various implementations disclosed herein.

For various implementations disclosed herein, a connectable tool 201 may be physically, electrically, and communicatively coupled to an autonomous vehicle 200 in the substantially fixed manner described above—which would support a connectable tool 201 operating as a floating platform—but, for several such implementations, so may a second (or alternate) connectable tool 302 be coupled physically, electrically, and communicatively to the autonomous vehicle 200 in a less fixed manner—sufficient to support a towed tool (or "towed platform"), for example—via an alternative interconnection arrangement such as the exemplary supplemental or alternative interconnection arrangement illustrated in FIG. 8A, FIG. 8B, and FIG. 8C.

FIG. 8A is a simplified block diagram 800 providing a side view of a general alternative interconnect interface for an autonomous vehicle and its corresponding general alternative connection interface for a connectable tool that are representative of the various implementations disclosed herein. FIG. 8B is a simplified block diagram 800' providing a top view of the general alternative interconnect interface and corresponding general alternative connection interface of FIG. 8A that are representative of the various implementations disclosed herein. FIG. 8C is modified block diagram 800″ providing a more detailed cross-sectional lateral-rotatable view (that is, a side view and alternately a top view) of the exemplary alternative interconnect interface and corresponding exemplary alternative connection interface corresponding to those shown in FIG. 8A and FIG. 8B (and other figures) representative of various implementations disclosed herein. For clarity and convenience, FIG. 8A and FIG. 8B and FIG. 8C may be referred to collectively as "FIG. 8" herein.

As shown in FIG. 8—and as referred to in other preceding figures—a second interconnect interface 250, comprising a base 252 operationally coupled to an extension 254, and a second connection interface 270, comprising a mount 272 operationally coupled to a receiver 274, and shown in FIGS. 8A and 8B as both unconnected 802 and interconnected 804. The connection represented in these figures is physical, electrical, and/or communicative as between the autonomous vehicle 200 and the second connectable tool 302.

As further illustrated in FIG. 8C, the base 252 may further comprise a power receiver 280 within a passage 278 with the mount 272 surmounted by the receiver 274 which may be shaped in the form of a guiding conic conduit 276 to assist in centering and engaging the extension 254 of the second interconnect interface 250. The extension 254, in turn, may further comprise a fixable engagement component 256, comprising a power-providing connection 258, and a flexible engagement component 268. The flexible engagement component 268 may further comprise a first pin 262 and first bracket 260 assembly and a second pin 266 and second bracket 264 assembly, each such assembly providing for circular bending in the direction perpendicular to said pins and perpendicular to each other to collectively provide two-dimensional partial-rotatability for the extension 254. Alternative implementations may instead use a ball-and-hitch assembly (a.k.a. "trail hitch plus ball mount"), rotatable hooks, ball-and-socket, or other interconnect options known and appreciated by skilled arts.

In operation, the autonomous vehicle 200—having detected and identified a second connectable tool 201 and aligned itself accordingly—may move such that the extension 254 is positioned to be at or near the guiding conic conduit 276 by the autonomous vehicle's 200 utilization of its sensing systems which may be augmented by devices (such as one or more specialized alignment cameras) specifically used for aligning the extension with the guiding conic conduit 276 to engage the power-providing connection 258 with the power receiver 280 and affixing the extension 254 within the passage 278 via automatic pins, locks, or any other fixing element (not shown). Additional, for several implementations disclosed herein, the autonomous vehicle 200 may comprise mechanical features (e.g., generic feature 288) for rotating, angling, or otherwise moving the extension 254 relative to the autonomous vehicle 200 in addition to the autonomous vehicle's 200 own ability to together move and align itself and the guiding conic conduit 276 and/or the passage 278 of the second connectable tool 302.

As before, the electrical connection can be tested by performing a power line modem (PLM) communications test between the autonomous vehicle 200 and the second connectable tool 302, with PLM also providing a communicative connection between same. Once PLM is established, enabling the provision of electrical power from the autonomous vehicle 200 to the second connectable tool 302, the electrical connection may be safely tested for current diversion (or equivalent) before full power is provided. If either PLM is unsuccessful or current diversion is discovered (indicating an unsafe electrical connection), the connectable tool may be partially or fully disconnected via a reversal of the foregoing interconnection steps and then re-interconnected until PLM is achieved and/or current diversion is determined to be negative. For the various implementations herein disclosed, and before commencing full power operations over said electrical power connection, determining that the electrical power connection without unsafe current diversion may be performed by transmitting a fixed amount of non-lethal electrical power from the autonomous vehicle to the connectable tool via the electrical power connection, and then determining whether the difference between the power transmitted by the autonomous vehicle and the power received by the connectable tool exceeds a threshold for indicating current diversion (the testing being facilitated by PLM communications there between).

Additionally, for second connectable tools 302 so configured with braking mechanisms (or other such supplemental devices), the autonomous vehicle 200 may cause the release of the braking mechanism (or operation of other such device) for said second connectable tool 302.

For the various implementations herein described and disclosed, the connectable tool and/or the second connectable tool may be any type of tool utilizable by an autonomous vehicle including without limitation a fixed floating platform, a configurable floating platform, a mower, a trimmer, an edger, a sprayer, a leaf blower, a snow blower, a debris blower, a sensing device, an inspection device, a surveillance device, a lighting device, an install device, an uninstall device, a foreign object detection device, a foreign object removal device, a radar device, a sonar device, a vacuum device, a digging device, a scooping device, a grabbing device, a sawing device, a chopping device, a hammering device, a jack-hammering device, a surface-coating device, an excavator, a bucket, a water carrier, a fuel carrier, a recharge platform, a solar platform, a luggage carrier, a tool carrier, a foreign object removal store, a material moving store, a trailer, a wagon, or a towed platform. Nothing herein is intended to limit a connectable tool or a second connectable tool to any specific tool except as appropriate to the specific context of a specific autonomous vehicle operating in a specific configuration for a specific purpose.

Regarding FIGS. 2-8, certain components—such as extension 254 and receiver 274—are shown as simple filled shapes as illustrative placeholders for any of several different options for achieving the functionality described for such implementations and wherein any of several different specific implementations may be utilized, and certain examples of which may be further illustrated in more detail in other illustrations. For example, one exemplary detailed option for generic extension 254 (shown in placeholder form in FIG. 8A and FIG. 8B (among other illustrations) is more fully illustrated in FIG. 8C. Accordingly, specific implementations for such generic components, as will be well-known and readily appreciated by skilled artisans, are hereby incorporated as alternative implementations including among the various implementations herein disclosed and anticipated.

Figure 9:
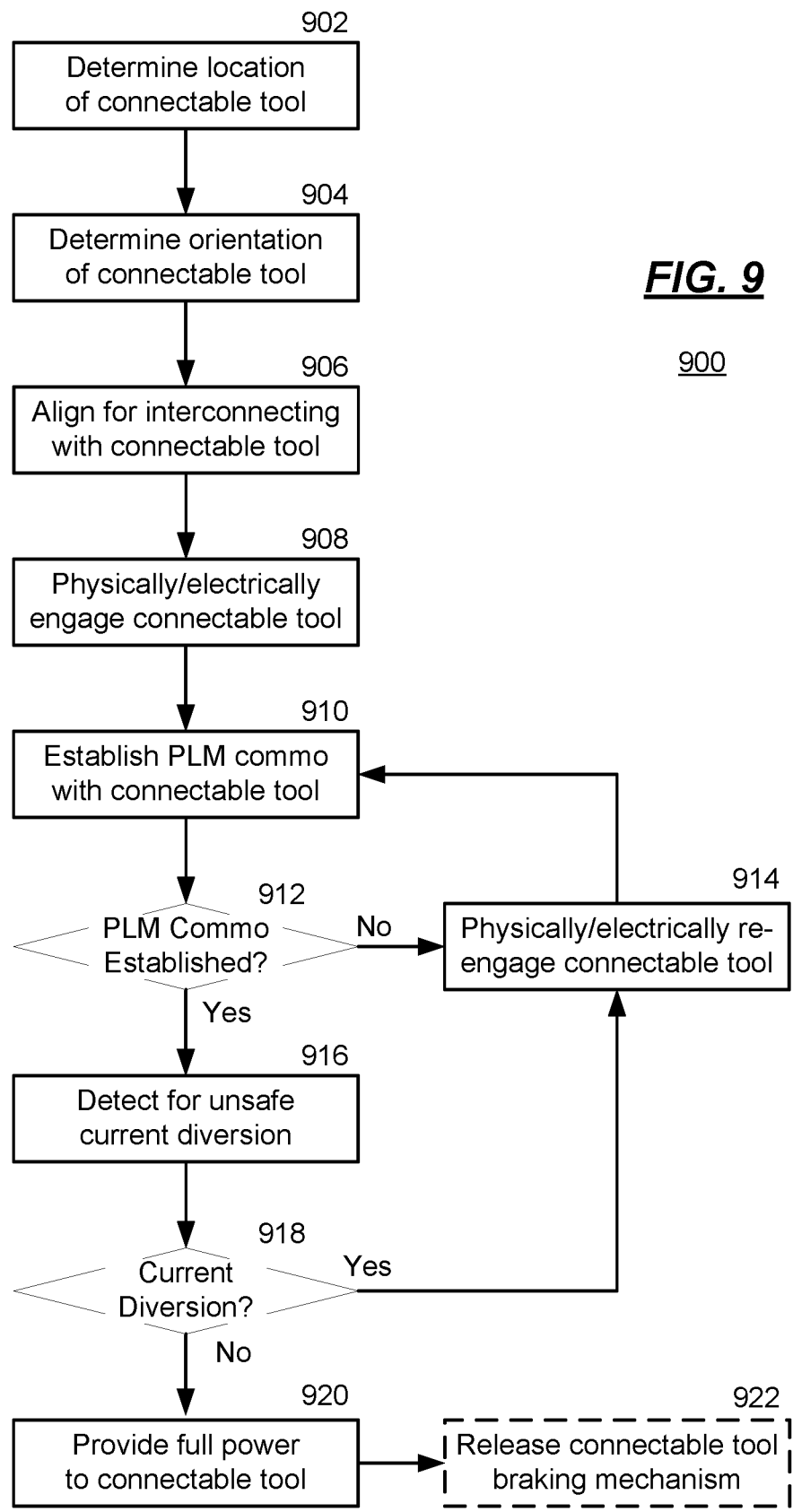
FIG. 9 is a process flow diagram, representative of the various implementations disclosed herein, illustrating an approach by which an autonomous vehicle may interconnect with a connectable tool.

FIG. 9 is a process flow diagram 900, representative of the various implementations disclosed herein, illustrating an approach by which an autonomous vehicle 200 may interconnect with a connectable tool 201 (and/or a second connectable tool 302). In FIG. 9, at 902 the autonomous vehicle may determine the location of a connection tool and, at 904, the autonomous vehicle may determine the orientation of said tool. At 906 the autonomous vehicle navigates to align itself for interconnecting with the connectable tool and, at 908, the autonomous vehicle physically and electrically (and communicatively) engages the connectable tool. At 910 the autonomous vehicle then establishes PLM communications with the connectable tool but, if the PLM communications are not success at 912, at 914 the autonomous vehicle re-engages (disconnects from and reconnects to) the connectable tool and again attempts to establish PLM communications at 910. When PLM commo is successful at 912, then at 916 the autonomous vehicle detects (tests for) unsafe current diversion and if detected (i.e., unsafe) then at 914 the autonomous vehicle re-engages (disconnects from and reconnects to) the connectable tool and returns to 910. Otherwise, if no current diversion is detected at 918, then at 920 the autonomous vehicle may begin providing full power to the connectable tool and, optionally for those connectable tools having a braking feature for functionality, at 922 the autonomous vehicle causes the release of a braking mechanism for the connectable tool.

Accordingly, based on the foregoing disclosures and the accompanying drawings, disclosed herein are various implementations directed to systems, processes, apparatuses, methods, computer-readable instructions, and other implementations for an autonomous vehicle to autonomously interconnect with a connectable tool comprising: aligning the autonomous vehicle for interconnecting with the connectable tool based on a location and an orientation of the connectable tool; engaging the connectable tool at one or more physical connection points and at least one electrical connection point; and establishing power line modem (PLM) communications between the autonomous vehicle and the connectable tool via an electrical power connection resulting from the engaging the at least one electrical connection point.

Furthermore, several such implementations may further comprise: re-engaging the at least one electrical connection point if the power line modem (PLM) communications cannot be established; determining that the electrical power connection is without current diversion before commencing full power operations over said electrical power connection; determining, prior to the aligning, the location corresponding to a connectable tool and/or the orientation for interconnecting with the connectable tool; after the establishing, releasing at least one braking mechanism on the connectable tool; and/or aligning the autonomous vehicle for interconnecting with a supplemental connectable tool based on a supplemental location and a supplemental orientation of the supplemental connectable tool, engaging the supplemental connectable tool at a supplemental-tool physical connection point and a supplemental-tool electrical connection point, and establishing power line modem (PLM) communications between the autonomous vehicle and the supplemental connectable tool via a supplemental-tool electrical power connection.

Moreover, certain such implementations may further comprise one of more of the following features whereby: the electrical power connection is formed at the at least one electrical connection point by a set of autonomous vehicle contacts physically contacting, with a biasing force or pressure, a corresponding set of connectable tool contacts; determining that the electrical power connection is without current diversion comprises (a) transmitting a fixed amount of non-lethal electrical power from the autonomous vehicle to the connectable tool via the electrical power connection, and (b) determining whether the difference between the power transmitted by the autonomous vehicle and the power received by the connectable tool exceeds a threshold for indicating current diversion; the connectable tool is operated by the autonomous vehicle as a floating platform, and/or the supplemental connectable tool is operated by the autonomous vehicle as a towed platform; the engaging is performed by an elevating connection component of the autonomous vehicle that is capable of operating at least one connectable tool as a floating platform; engaging the connectable tool at one or more physical connection points comprises utilization, by the autonomous vehicle, of at least one hook-and-lock connection mechanism; engaging the connectable tool at one or more physical connection points comprises first-engaging the connectable tool at one or more primary connection points, and second-engaging the connectable tool at one or more secondary connection points by the autonomous vehicle rotatably vertical-lifting the connectable tool at the one or more primary connection points: wherein, after the first-engaging, the engaging the at least one electrical connection point is performed by the autonomous vehicle rotatably vertical-lifting the connectable tool at the one or more primary connection points; the engaging is performed by a partially-rotatable connection component of the autonomous vehicle that is capable of operating at least one connectable tool as a towed platform; the partially-rotatable connection component further comprises a fixable engagement component for guided insertion into a first physical connection point of the connectable tool, and/or a flexible engagement component, capable of partial-rotatability, operationally coupled to the fixable engagement component and to the autonomous vehicle; the engaging the connectable tool at the one or more physical connection points contemporaneously engages the connectable tool at the at least one electrical connection points through the fixable engagement component; engaging the connectable tool at one or more physical connection points comprises utilization, by the autonomous vehicle, of at least one hitch-and-lock connection mechanism; and/or the at least one connectable tool comprises at least one device from among the following group of devices: a fixed floating platform, a configurable floating platform, a mower, a trimmer, an edger, a sprayer, a leaf blower, a snow blower, a debris blower, a sensing device, an inspection device, a surveillance device, a lighting device, an install device, an uninstall device, a foreign object detection device, a foreign object removal device, a radar device, a sonar device, a vacuum device, a digging device, a scooping device, a grabbing device, a sawing device, a chopping device, a hammering device, a jack-hammering device, a surface-coating device, an excavator, a bucket, a water carrier, a fuel carrier, a recharge platform, a solar platform, a luggage carrier, a tool carrier, a foreign object removal store, a material moving store, a trailer, a wagon, or a towed platform.

Variations/Configurations

For certain implementations, the autonomous vehicle may have four wheels with two positioned forward and widely dispersed to the outsides of the tractor and provide the driving force to propel the tractor and the system, including opposing propulsive force to facilitate turning. Two additional wheels may also be utilized and disposed to the rear of the tractor and provide stability. For alternate implementations, four wheels may be disposed at the corners of the tractor where all four are modified to provide propulsive force and/or turning capabilities to the autonomous vehicle. Other alternative implementations may instead employ a different number of drive wheels or guide wheels. Moreover, for a variety of implementations, the autonomous vehicle may be a low- or zero-turn vehicle, that is, a vehicle that can achieve a small turn radius or a turn radius that is effectively zero.

The various implementations disclosed herein may operate on battery-stored electrical power for which a charging system for the autonomous vehicle is provided in any of several different configurations and having a variety of different features. For solar farm and wind farm installations, for example, the charging system may operate on electrical power produced by the farm; however, because there may be times when maintenance is required when the sun is obscured or wind calm and such power is not available—or, more commonly, when the site may not allow for utilization of the power produced by the site or when the site is not a power-producing site—several such implementations are directed to a charging system for an autonomous vehicle may be configured to rely on other power sources, may generate its own power, or may store and transport power from other locations and other sources for utilization by or replenishment of the autonomous vehicle when needed.

Although certain implementations described herein are specifically directed to mobile automated maintenance systems and related methods for facilities and installations on a large acreage where ground cover is desired to prevent soil/ground erosion, provide pleasing aesthetics, or for other reasons, and that these implementations may be discussed primarily in terms of maintenance operations at solar farms (or other renewal energy sites such as those for wind turbine farms, ash ponds, or other facilities or installations), it will be readily understood and well-appreciated by skilled artisans that the various implementations described herein have broad applicability to other utilizations and are not limited to renewable energy or power generation facilities or installations in any way whatsoever. Instead, the various implementations disclosed herein should be broadly understood to be applicable to utilizations beyond renewable energy and also should be understood as disclosing such utilizations in the broadest contexts possible consistent with the disclosures made herein.

An autonomous mower is one example of an autonomous vehicle and which may comprise a mowing deck and a tractor. The tractor may also include a main body that houses various electrical components and electronics such as batteries, drive motors, a battery- or power-management system, component controllers, sensors (e.g., lidar, radar, IMU, inertial navigation systems, temperature sensors, humidity sensors, noise sensors, accelerometers, pressure sensors, GPS, ultrasonic sensors, cameras or other sensors), network interface devices, a computer system to provide overall control of the mower, and/or other components.

A mowing deck (or "mowing platform") may include one or more blades disposed below the mowing deck. The mowing deck may be supported by a number of wheels. For certain implementations, the mowing deck may be cantilevered from the tractor without supporting wheels. Power may be provided through electrical connections to motors on the mowing deck to drive the mower blades.

A mowing deck may be adapted to provide for low-profile mowing that can pass under solar panels, even when the solar panels are positioned close to the ground and the tractor cannot drive under them. For example, a mowing deck may be disposed forward of tractor and outside of the wheels of a tractor, and thus the tractor can drive the mowing deck into spaces which the tractor cannot go such as under panels that are lower to the ground than the top of the tractor. The form factor of the mowing deck may be selected to achieve a desired cutting width and low profile. A mowing deck may also be otherwise configured to have a larger or smaller width, to work in different clearances, and to have different mowing heights. For several implementations, a mowing deck may be raised and lowered and, in addition or in the alternative, a mowing deck may be tilted up and down.

Exemplary Computing Environment

Figure 10:
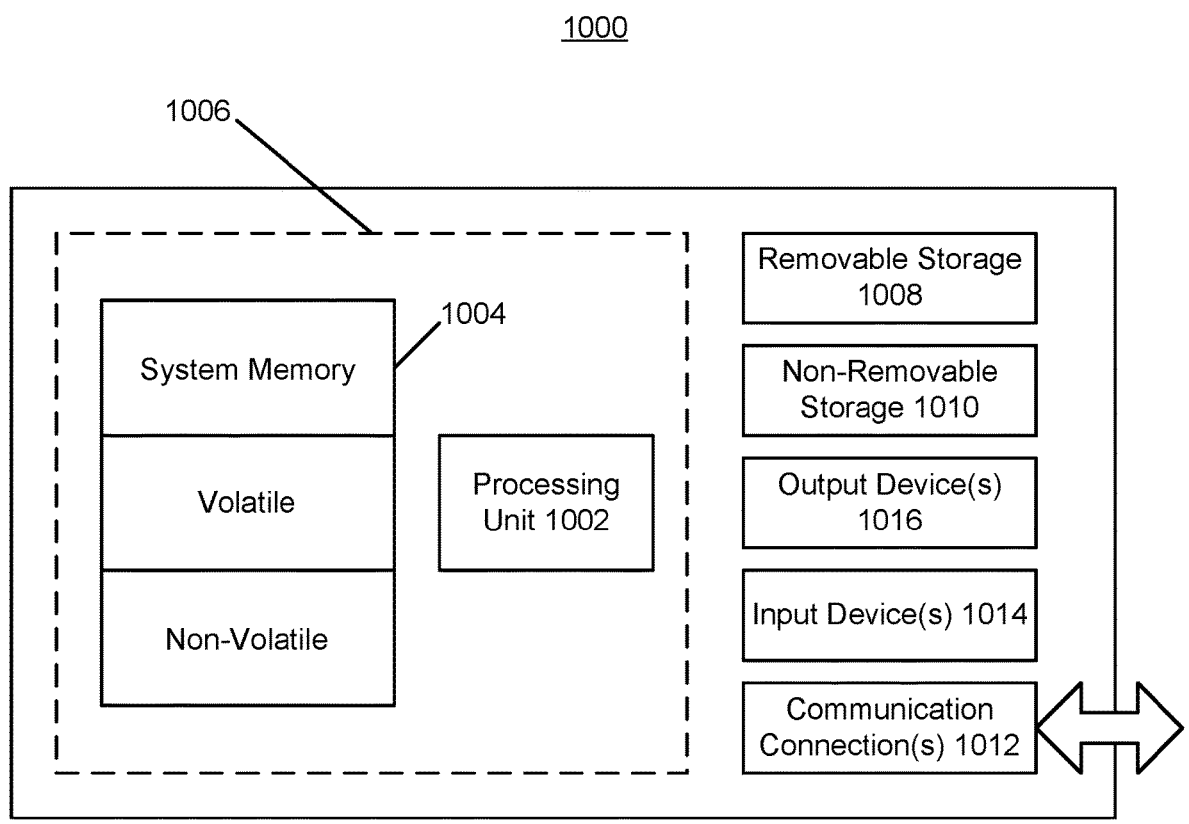
FIG. 10 is a block diagram of an example computing environment that may be used in conjunction with any of the various implementations and aspects herein disclosed.

FIG. 10 is a block diagram 1000 of an example computing environment that may be used in conjunction with example implementations and aspects such as those disclosed and described with regard to FIGS. 1-9. The computing system environment is only one example of a suitable computing environment and is not intended to suggest any limitation as to the scope of use or functionality.

Numerous other general purpose or special purpose computing system environments or configurations may be used. Examples of well-known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, and so forth that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA), an analog-to-digital converter (ADC), or other programmable logic device, discrete gate or transistor logic, discrete hardware components, discrete data acquisition components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

With reference to FIG. 10, an exemplary system for implementing aspects described herein includes a computing device, such as computing device 1000. In a basic configuration, computing device 1000 typically includes at least one processing unit 1002 and memory 1004. Depending on the exact configuration and type of computing device, memory 1004 may be volatile (such as random access memory (RAM)), non-volatile (such as read-only memory (ROM), flash memory, etc.), or some combination of the two. This basic configuration is illustrated in FIG. 10 by dashed line 1006 as may be referred to collectively as the "compute" component.

Computing device 1000 may have additional features/functionality. For example, computing device 1000 may include additional storage (removable and/or non-removable) including, but not limited to, magnetic or optical disks or tape. Such additional storage is illustrated in FIG. 10 by removable storage 1008 and non-removable storage 1010. Computing device 1000 typically includes a variety of computer readable media. Computer readable media can be any available media that can be accessed by device 1000 and may include both volatile and non-volatile media, as well as both removable and non-removable media.

Computer storage media include volatile and non-volatile media, as well as removable and non-removable media, implemented in any method or technology for storage of information such as computer readable instructions, data structures, program modules or other data. Memory 1004, removable storage 1008, and non-removable storage 1010 are all examples of computer storage media. Computer storage media include, but are not limited to, RAM, ROM, electrically erasable program read-only memory (EEPROM), flash memory or other memory technology, CD-ROM, digital versatile disks (DVD), or other optical storage, magnetic cassettes, magnetic tape, magnetic disk storage or other magnetic storage devices, or any other medium which can be used to store the information and which can be accessed by computing device 1000. Any such computer storage media may be part of computing device 1000.

Computing device 1000 may contain communication connection(s) 1012 that allow the device to communicate with other devices. Computing device 1000 may also have input device(s) 1014 such as a keyboard, mouse, pen, voice input device, touch input device, and so forth. Output device(s) 1016 such as a display, speakers, printer, and so forth may also be included. All these devices are well-known in the art and need not be discussed at length herein. Computing device 1000 may be one of a plurality of computing devices 1000 interconnected by a network. As may be appreciated, the network may be any appropriate network, each computing device 1000 may be connected thereto by way of communication connection(s) 1012 in any appropriate manner, and each computing device 1000 may communicate with one or more of the other computing devices 1000 in the network in any appropriate manner. For example, the network may be a wired or wireless network within an organization or home or the like, and may include a direct or indirect coupling to an external network such as the Internet or the like. Moreover, PCI, PCIe, and other bus protocols might be utilized for embedding the various implementations described herein into other computing systems.

Interpretation of Disclosures Herein

It should be understood that the various techniques described herein may be implemented in connection with hardware or software or, where appropriate, with a combination of both. Thus, the processes and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an API, reusable controls, or the like. Such programs may be implemented in a high-level procedural or object-oriented programming language to communicate with a computer system. However, the program(s) can be implemented in assembly or machine language. In any case, the language may be a compiled or interpreted language and it may be combined with hardware implementations.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include PCs, network servers, and handheld devices, for example.

Certain implementations described herein may utilize a cloud operating environment that supports delivering computing, processing, storage, data management, applications, and other functionality as an abstract service rather than as a standalone product of computer hardware, software, etc. Services may be provided by virtual servers that may be implemented as one or more processes on one or more computing devices. In some implementations, processes may migrate between servers without disrupting the cloud service. In the cloud, shared resources (e.g., computing, storage) may be provided to computers including servers, clients, and mobile devices over a network. Different networks (e.g., Ethernet, Wi-Fi, 802.x, cellular) may be used to access cloud services. Users interacting with the cloud may not need to know the particulars (e.g., location, name, server, database, etc.) of a device that is actually providing the service (e.g., computing, storage). Users may access cloud services via, for example, a web browser, a thin client, a mobile application, or in other ways. To the extent any physical components of hardware and software are herein described, equivalent functionality provided via a cloud operating environment is also anticipated and disclosed.

Additionally, a controller service may reside in the cloud and may rely on a server or service to perform processing and may rely on a data store or database to store data. While a single server, a single service, a single data store, and a single database may be utilized, multiple instances of servers, services, data stores, and databases may instead reside in the cloud and may, therefore, be used by the controller service. Likewise, various devices may access the controller service in the cloud, and such devices may include (but are not limited to) a computer, a tablet, a laptop computer, a desktop monitor, a television, a personal digital assistant, and a mobile device (e.g., cellular phone, satellite phone, etc.). It is possible that different users at different locations using different devices may access the controller service through different networks or interfaces. In one example, the controller service may be accessed by a mobile device. In another example, portions of controller service may reside on a mobile device. Regardless, controller service may perform actions including, for example, presenting content on a secondary display, presenting an application (e.g., browser) on a secondary display, presenting a cursor on a secondary display, presenting controls on a secondary display, and/or generating a control event in response to an interaction on the mobile device or other service. In specific implementations, the controller service may perform portions of methods described herein.

Anticipated Alternatives

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Moreover, it will be apparent to one skilled in the art that other implementations may be practiced apart from the specific details disclosed above.

The drawings described above and the written description of specific structures and functions below are not presented to limit the scope of what has been invented or the scope of the appended claims. Rather, the drawings and written description are provided to teach any person skilled in the art to make and use the inventions for which patent protection is sought. Those skilled in the art will appreciate that not all features of a commercial implementation of the inventions are described or shown for the sake of clarity and understanding. Skilled artisans will further appreciate that block diagrams herein can represent conceptual views of illustrative circuitry embodying the principles of the technology, and that any flow charts, state transition diagrams, pseudocode, and the like represent various processes which may be embodied in computer readable medium and so executed by a computer or processor, whether or not such computer or processor is explicitly shown. The functions of the various elements including functional blocks may be provided through the use of dedicated electronic hardware as well as electronic circuitry capable of executing computer program instructions in association with appropriate software. Persons of skill in this art will also appreciate that the development of an actual commercial implementation incorporating aspects of the inventions will require numerous implementation-specific decisions to achieve the developer's ultimate goal for the commercial implementation. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure.

It should be understood that the implementations disclosed and taught herein are susceptible to numerous and various modifications and alternative forms. Thus, the use of a singular term, such as, but not limited to, "a" and the like, is not intended as limiting of the number of items. Also, the use of relational terms, such as, but not limited to, "top," "bottom," "left," "right," "upper," "lower," "down," "up," "side," and the like, are used in the written description for clarity in specific reference to the drawings and are not intended to limit the scope of the invention or the appended claims. For particular implementations described with reference to block diagrams and/or operational illustrations of methods, it should be understood that each block of the block diagrams and/or operational illustrations, and combinations of blocks in the block diagrams and/or operational illustrations, may be implemented by analog and/or digital hardware, and/or computer program instructions. Computer programs instructions for use with or by the implementations disclosed herein may be written in an object oriented programming language, conventional procedural programming language, or lower-level code, such as assembly language and/or microcode. The program may be executed entirely on a single processor and/or across multiple processors, as a stand-alone software package or as part of another software package. Such computer program instructions may be provided to a processor of a general-purpose computer, special-purpose computer, ASIC, and/or other programmable data processing system. The executed instructions may also create structures and functions for implementing the actions specified in the mentioned block diagrams and/or operational illustrations. In some alternate implementations, the functions/actions/structures noted in the drawings may occur out of the order noted in the block diagrams and/or operational illustrations. For example, two operations shown as occurring in succession, in fact, may be executed substantially concurrently or the operations may be executed in the reverse order, depending on the functionality/acts/structure involved.

The term "computer-readable instructions" as used above refers to any instructions that may be performed by the processor and/or other components. Similarly, the term "computer-readable medium" refers to any storage medium that may be used to store the computer-readable instructions. Such a medium may take many forms, including, but not limited to, non-volatile media, volatile media, and transmission media. Non-volatile media may include, for example, optical or magnetic disks, such as the storage device. Volatile media may include dynamic memory, such as main memory. Transmission media may include coaxial cables, copper wire and fiber optics, including wires of the bus. Transmission media may also take the form of acoustic or light waves, such as those generated during radio frequency (RF) and infrared (IR) data communications. Common forms of computer-readable media may include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

In the foregoing description, for purposes of explanation and non-limitation, specific details are set forth—such as particular nodes, functional entities, techniques, protocols, standards, etc. in order to provide an understanding of the described technology. In other instances, detailed descriptions of well-known methods, devices, techniques, etc. are omitted so as not to obscure the description with unnecessary detail. All statements reciting principles, aspects, embodiments, and implementations, as well as specific examples, are intended to encompass both structural and functional equivalents, and such equivalents include both currently known equivalents as well as equivalents developed in the future, i.e., any elements developed that perform the same function, regardless of structure. While the disclosed implementations have been described with reference to one or more particular implementations, those skilled in the art will recognize that many changes may be made thereto. Therefore, each of the foregoing implementations and obvious variations thereof is contemplated as falling within the spirit and scope of the disclosed implementations, which are set forth in the claims presented below.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

What is claimed:

1. A method for an autonomous vehicle to interconnect with a connectable tool, the method comprising:
    aligning the autonomous vehicle for interconnecting with the connectable tool based on a location and an orientation of the connectable tool;
    engaging the connectable tool at one or more physical connection points and at least one electrical connection point;
    establishing power line modem (PLM) communications between the autonomous vehicle and the connectable tool via an electrical power connection resulting from the engaging the at least one electrical connection point; and
    before commencing full power operations over said electrical power connection, determining that the electrical power connection is without current diversion by:
        transmitting a fixed amount of non-lethal electrical power from the autonomous vehicle to the connectable tool via the electrical power connection, and
        determining whether the difference between the power transmitted by the autonomous vehicle and the power received by the connectable tool exceeds a threshold for indicating current diversion.

2. The method of claim 1, further comprising re-engaging the at least one electrical connection point if the power line modem (PLM) communications cannot be established.

3. The method of claim 1, wherein the electrical power connection is formed at the at least one electrical connection point by a set of autonomous vehicle contacts physically contacting, with a biasing force or pressure, a corresponding set of connectable tool contacts.

4. The method of claim 1, further comprising:
    determining, prior to the aligning, the location corresponding to a connectable tool; and
    determining, prior to the aligning, the orientation for interconnecting with the connectable tool.

5. The method of claim 1, further comprising:
    aligning the autonomous vehicle for interconnecting with a supplemental connectable tool based on a supplemental location and a supplemental orientation of the supplemental connectable tool;
    engaging the supplemental connectable tool at a supplemental-tool physical connection point and a supplemental-tool electrical connection point; and
    establishing power line modem (PLM) communications between the autonomous vehicle and the supplemental connectable tool via a supplemental-tool electrical power connection.

6. The method of claim 5, wherein:
    the connectable tool is operated by the autonomous vehicle as a floating platform; and
    the supplemental connectable tool is operated by the autonomous vehicle as a towed platform.

7. The method of claim 1, wherein the at least one connectable tool comprises at least one device from among the following group of devices: a fixed floating platform, a configurable floating platform, a mower, a trimmer, an edger, a sprayer, a leaf blower, a snow blower, a debris blower, a sensing device, an inspection device, a surveillance device, a lighting device, an install device, an uninstall device, a foreign object detection device, a foreign object removal device, a radar device, a sonar device, a vacuum device, a digging device, a scooping device, a grabbing device, a sawing device, a chopping device, a hammering device, a jack-hammering device, a surface-coating device, an excavator, a bucket, a water carrier, a fuel carrier, a recharge platform, a solar platform, a luggage carrier, a tool carrier, a foreign object removal store, a material moving store, a trailer, a wagon, or a towed platform.

8. The method of claim 1, wherein the engaging is performed by an elevating connection component of the autonomous vehicle that is capable of operating at least one connectable tool as a floating platform.

9. The method of claim 1, wherein engaging the connectable tool at one or more physical connection points comprises utilization, by the autonomous vehicle, of at least one hook-and-lock connection mechanism.

10. The method of claim 1, wherein engaging the connectable tool at one or more physical connection points comprises:
    first-engaging the connectable tool at one or more primary connection points; and
    second-engaging the connectable tool at one or more secondary connection points by the autonomous vehicle rotatably vertical-lifting the connectable tool at the one or more primary connection points.

11. The method of claim 10, wherein, after the first-engaging, the engaging the at least one electrical connection point is performed at least in part by the autonomous vehicle rotatably vertical-lifting the connectable tool at the one or more primary connection points.

12. The method of claim 1, wherein the engaging is performed by a partially-rotatable connection component of the autonomous vehicle that is capable of operating at least one connectable tool as a towed platform.

13. The method of claim 12, wherein the partially-rotatable connection component further comprises:
    a fixable engagement component for guided insertion into a first physical connection point of the connectable tool; and
    a flexible engagement component, capable of partial-rotatability, operationally coupled to the fixable engagement component and to the autonomous vehicle.

14. The method of claim 13, wherein the engaging the connectable tool at the one or more physical connection points contemporaneously engages the connectable tool at the at least one electrical connection points through the fixable engagement component.

15. The method of claim 12, further comprising, after the establishing, releasing at least one braking mechanism on the connectable tool.

16. The method of claim 12, wherein engaging the connectable tool at one or more physical connection points comprises utilization, by the autonomous vehicle, of at least one hitch-and-lock connection mechanism.

17. A non-transitory computer-readable medium comprising computer-executable instructions for execution by an autonomous vehicle, the computer-executable instructions comprising instructions for:

determining a location corresponding to a connectable tool;

determining an orientation for interconnecting with the connectable tool;

aligning the autonomous vehicle for interconnecting with the connectable tool based on a location and an orientation of the connectable tool;

engaging the connectable tool at one or more physical connection points and at least one electrical connection point;

establishing power line modem (PLM) communications between the autonomous vehicle and the connectable tool via an electrical power connection resulting from the engaging the at least one electrical connection point; and before commencing full power operations over said electrical power connection, determining that the electrical power connection is without current diversion by:

transmitting a fixed amount of non-lethal electrical power from the autonomous vehicle to the connectable tool via the electrical power connection, and determining whether the difference between the power transmitted by the autonomous vehicle and the power received by the connectable tool exceeds a threshold for indicating current diversion.

18. An autonomous vehicle comprising at least one subsystem capable of:

determining a location corresponding to a connectable tool;

determining an orientation for interconnecting with the connectable tool;

aligning the autonomous vehicle for interconnecting with the connectable tool based on the location and the orientation of the connectable tool;

engaging the connectable tool at one or more physical connection points and at least one electrical connection point;

establishing power line modem (PLM) communications between the autonomous vehicle and the connectable tool via an electrical power connection resulting from the engaging the at least one electrical connection point; and before commencing full power operations over said electrical power connection, determining that the electrical power connection is without current diversion by:

transmitting a fixed amount of non-lethal electrical power from the autonomous vehicle to the connectable tool via the electrical power connection; and determining whether the difference between the power transmitted by the autonomous vehicle and the power received by the connectable tool exceeds a threshold for indicating current diversion.

\* \* \* \* \*